(12) United States Patent
Park et al.

(10) Patent No.: US 11,736,146 B2
(45) Date of Patent: *Aug. 22, 2023

(54) APPARATUS AND METHOD FOR SUPPORTING HETEROGENEOUS COMMUNICATION IN WIRELESS POWER TRANSMISSION SYSTEM

(71) Applicant: LG Electronics Inc., Seoul (KR)

(72) Inventors: Yongcheol Park, Seoul (KR); Gyunghwan Yook, Seoul (KR); Seonghun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 88 days.

This patent is subject to a terminal disclaimer.

(21) Appl. No.: 17/346,724

(22) Filed: Jun. 14, 2021

(65) Prior Publication Data

US 2021/0306036 A1 Sep. 30, 2021

Related U.S. Application Data

(63) Continuation of application No. 16/988,367, filed on Aug. 7, 2020, now Pat. No. 11,063,636, which is a
(Continued)

(30) Foreign Application Priority Data

Mar. 22, 2018 (KR) .................. 10-2018-0033061

(51) Int. Cl.
*H04B 5/00* (2006.01)
*H02J 50/12* (2016.01)
(Continued)

(52) U.S. Cl.
CPC ............ *H04B 5/0037* (2013.01); *H02J 50/12* (2016.02); *H04W 36/30* (2013.01); *H02J 50/40* (2016.02)

(58) Field of Classification Search
CPC ......... H04B 5/0037; H04B 5/00; H02J 50/12; H02J 50/40; H02J 50/10; H02J 50/80;
(Continued)

(56) References Cited

U.S. PATENT DOCUMENTS

2012/0242283 A1* 9/2012 Kim ..................... H04B 5/0037
320/108
2016/0126749 A1 5/2016 Shichino
(Continued)

FOREIGN PATENT DOCUMENTS

KR 20110043948 4/2011
KR 20120102316 9/2012
(Continued)

OTHER PUBLICATIONS

Miridakis et al., "A New Interweave Cognitive Radio Scheme for Out-Band Energy Harvesting Systems," Institute of Electrical and Electronics Engineers, dated Nov. 15, 2018, 8 pages.

*Primary Examiner* — Hirdepal Singh
(74) *Attorney, Agent, or Firm* — Fish & Richardson P.C.

(57) ABSTRACT

An apparatus and a method for performing handover between heterogeneous communication methods. A wireless power transmission apparatus and reception apparatus can indicate whether to support out-band communication thereof on the basis of an out-band flag. The wireless power transmission apparatus can request the wireless power reception apparatus to start a handover by using a bit pattern requesting the handover. The handover procedure to out-band may be performed in a negotiation phase or may be performed in a separate handover phase. Information for establishing an out-band communication connection can be transmitted from the wireless power reception apparatus to the wireless power transmission apparatus through in-band communication. Also, even after the handover to the out-band is completed, it is possible to periodically or intermit-
(Continued)

tently perform the in-band communication in a power transmission phase to detect a swap of the wireless power reception apparatus.

17 Claims, 32 Drawing Sheets

Related U.S. Application Data continuation of application No. PCT/KR2019/001819, filed on Feb. 14, 2019.

(60) Provisional application No. 62/630,749, filed on Feb. 14, 2018, provisional application No. 62/631,947, filed on Feb. 19, 2018, provisional application No. 62/633,084, filed on Feb. 21, 2018.

(51) Int. Cl.
*H04W 36/30* (2009.01)
*H02J 50/40* (2016.01)

(58) Field of Classification Search
CPC ..... H04W 36/30; H04W 36/14; H04W 88/06; H04L 9/40; Y02T 90/169
USPC .......................................................... 340/12.5
See application file for complete search history.

(56) References Cited

U.S. PATENT DOCUMENTS

| | | |
|---|---|---|
| 2016/0204642 A1 | 7/2016 | Oh et al. |
| 2017/0331335 A1 | 11/2017 | Brooks et al. |
| 2018/0123379 A1* | 5/2018 | Ha .......... H02J 7/342 |
| 2019/0058360 A1* | 2/2019 | Garbus ................ H02J 50/60 |
| 2019/0148968 A1 | 5/2019 | Kim et al. |
| 2019/0363758 A1* | 11/2019 | Shichino .............. H04B 5/02 |
| 2020/0161907 A1 | 5/2020 | Yang et al. |

FOREIGN PATENT DOCUMENTS

| | | |
|---|---|---|
| KR | 20130006326 | 1/2013 |
| KR | 20140017770 | 2/2014 |
| WO | WO2016171456 | 10/2016 |

* cited by examiner

FIG. 10

| Preamble | ZERO | Response | Type | Info | Parity |
|----------|------|----------|------|------|--------|

Response
'00' : no comms
'01' : comms error
'10' : NAK
'11' : ACK

Type
ZERO : slot sync
ONE : frame sync

Parity : odd

Info (Type is ZERO)
'00' : allocated
'01' : locked
'10' : free
'11' : reserved

Info (Type is ONE)
'00' : slotted
'01' : frees format
'10' : reserved
'11' : reserved

FIG. 12

|  | $b_7$ | $b_6$ | $b_5$ | $b_4$ | $b_3$ | $b_2$ | $b_1$ | $b_0$ |
|---|---|---|---|---|---|---|---|---|
| $B_0$ | Power Class | | Guaranteed Power Value | | | | | |
| $B_1$ | Reserved | | Potential Power Value | | | | | |
| $B_2$ | OOB (BLE) | Reserved | | | | | WPID | Not Res Sens |

FIG. 13

|       | $b_7$       | $b_6$      | $b_5$        | $b_4$   | $b_3$  | $b_2$         | $b_1$ | $b_0$ |
|-------|-------------|------------|--------------|---------|--------|---------------|-------|-------|
| $B_0$ | Power Class |            | Maximum Power Value |  |  |      |       |       |
| $B_1$ |             |            | OOB (BLE)    | Reserved |  |              |       |       |
| $B_2$ | Prop        | Reserved   |              |         | ZERO   | Count         |       |       |
| $B_3$ | Window Size |            |              |         | Window Offset |        |       |       |
| $B_4$ | Neg         | Polarity*  | Depth*       |         | Reserved |             |       |       |

FIG. 18

|       | $b_7$ | $b_6$ | $b_5$ | $b_4$ | $b_3$ | $b_2$ | $b_1$ | $b_0$ |
|-------|-------|-------|-------|-------|-------|-------|-------|-------|
| $B_0$ | \multicolumn{8}{c}{BLE MAC Address_B0} |
| $B_1$ | \multicolumn{8}{c}{BLE MAC Address_B1} |
| $B_2$ | \multicolumn{8}{c}{BLE MAC Address_B2} |
| $B_3$ | \multicolumn{8}{c}{BLE MAC Address_B3} |
| $B_4$ | \multicolumn{8}{c}{BLE MAC Address_B4} |
| $B_5$ | \multicolumn{8}{c}{BLE MAC Address_B5} |

APPARATUS AND METHOD FOR SUPPORTING HETEROGENEOUS COMMUNICATION IN WIRELESS POWER TRANSMISSION SYSTEM

CROSS-REFERENCE TO RELATED APPLICATION

This application is a continuation of U.S. application Ser. No. 16/988,367, filed on Aug. 7, 2020, which is a continuation is pursuant to 35 U.S.C. § 119(e) of International Application No. PCT/KR2019/001819, with an international filing date of Feb. 14, 2019, which claims the benefit of U.S. Provisional Patent Application Nos. 62/630,749 filed on Feb. 14, 2018, 62/631,947 filed on Feb. 19, 2018, 62/633,084 filed on Feb. 21, 2018 and Korean Patent Application No. 10-2018-0033061 filed on Mar. 22, 2018, the contents of which are hereby incorporated by reference herein in their entirety.

TECHNICAL FIELD

The embodiment relates to wireless charging, and more particularly, to an apparatus and method supporting heterogeneous communication in a wireless power transmission system.

BACKGROUND

The wireless power transfer (or transmission) technology corresponds to a technology that can wirelessly transfer (or transmit) power between a power source and an electronic device. For example, by allowing the battery of a wireless device, such as a smartphone or a tablet PC, and so on, to be recharged by simply loading the wireless device on a wireless charging pad, the wireless power transfer technique may provide more outstanding mobility, convenience, and safety as compared to the conventional wired charging environment, which uses a wired charging connector. Apart from the wireless charging of wireless devices, the wireless power transfer technique is raising attention as a replacement for the conventional wired power transfer environment in diverse fields, such as electric vehicles, Bluetooth earphones, 3D glasses, diverse wearable devices, household (or home) electric appliances, furniture, underground facilities, buildings, medical equipment, robots, leisure, and so on.

The wireless power transfer (or transmission) method is also referred to as a contactless power transfer method, or a no point of contact power transfer method, or a wireless charging method. A wireless power transmission system may be configured of a wireless power transmitter supplying electric energy by using a wireless power transfer method, and a wireless power receiver receiving the electric energy being supplied by the wireless power transmitter and supplying the receiving electric energy to a receiver, such as a battery cell, and so on.

The wireless power transfer technique includes diverse methods, such as a method of transferring power by using magnetic coupling, a method of transferring power by using radio frequency (RF), a method of transferring power by using microwaves, and a method of transferring power by using ultrasound (or ultrasonic waves). The method that is based on magnetic coupling is categorized as a magnetic induction method and a magnetic resonance method. The magnetic induction method corresponds to a method transmitting power by using electric currents that are induced to the coil of the receiver by a magnetic field, which is generated from a coil battery cell of the transmitter, in accordance with an electromagnetic coupling between a transmitting coil and a receiving coil. The magnetic resonance method is similar to the magnetic induction method in that is uses a magnetic field. However, the magnetic resonance method is different from the magnetic induction method in that energy is transmitted due to a concentration of magnetic fields on both a transmitting end and a receiving end, which is caused by the generated resonance.

In the conventional wireless power transmission system, communication between a wireless power transmitter and receiver generally uses an amplitude shift keying (ASK) using a magnetic field change and frequency shift keying (FSK) using a frequency change. However, since the ASK and the FSK have a transfer rate of only a few kHz and are vulnerable to electrical and magnetic disturbances, the conventional communication scheme is not suitable for medium power level transmission required in an evolved wireless power transmission system or massive data transmission such as authentication. Therefore, a method for selecting various communication protocols between the wireless power transmitter and receiver is required to support various applications of wireless power transmission.

SUMMARY

An aspect of the disclosure provides an apparatus and method supporting heterogeneous communication in a wireless power transmission system.

Another aspect of the disclosure provides an apparatus and method supporting a heterogeneous communication channel for WPC PC0 and PC1.

Still another aspect of the disclosure provides an apparatus and method for performing a handover between heterogeneous communication schemes in a wireless power transmission system.

Still another aspect of the disclosure provides a packet structure and procedure for supporting a heterogeneous communication scheme in a wireless power communication system.

According to an aspect of the disclosure, there is provided a wireless power receiver supporting heterogeneous communication. The wireless power receiver includes a power pick-up unit configured to receive wireless power from a wireless power transmitter through magnetic coupling with the wireless power transmitter at an operating frequency and change an alternating current (AC) signal generated by the wireless power into a direct current (DC) signal, a communication/control unit configured to receive the DC signal provided from the power pick-up unit and perform communication with the wireless power transmitter, a load configured to receive the DC signal provided from the power pick-up unit.

Herein, the communication/control unit may be configured to perform at least one of in-band communication using the operating frequency and out-band communication using a frequency other than the operating frequency. The communication/control unit may be configured to receive a capability packet including an out-band flag informing whether the wireless power transmitter supports the out-band communication through the in-band communication in an identification and configuration phase. The communication/control unit may be configured to perform a procedure for performing a handover to out-band, before entering a power transfer phase that the power pick-up unit receives the wireless power.

In addition, the procedure of performing the handover to out-may include transmitting information regarding the handover to out-band by the communication/control unit to the wireless power transmitter in a negotiation phase, based on the in-band communication.

In addition, the procedure for performing the handover to out-band may include transmitting information regarding the handover to out-band by the communication/control unit to the wireless power transmitter in a handover phase, based on the in-band communication.

In addition, the information regarding the handover to out-band may include an out-band medium access control (MAC) address packet of the wireless power receiver.

In addition, the procedure for performing the handover to out-band may be initiated by the communication/control unit receiving a request signal which requests for initiation of the handover to out-band from the wireless power transmitter.

In addition, the request signal may be a bit pattern of 8 bits informing the handover to out-band.

In addition, the communication/control unit may be configured to perform the out-band communication with the wireless power transmitter in the power transfer phase based on completion of the handover procedure, and transmit unique information or bit pattern information for swap detection of the wireless power receiver to the wireless power transmitter by using the in-band communication in the power transfer phase.

According to another aspect of the present disclosure, there is provided a wireless power transmitter supporting heterogeneous communication. The wireless power transmitter includes a power conversion unit configured to transmit wireless power to a wireless power receiver through magnetic coupling with the wireless power receiver at an operating frequency, and a communication/control unit configured to perform at least one of in-band communication using the operating frequency and out-band communication using a frequency other than the operating frequency. The communication/control unit may be configured to transmit a capability packet including an out-band flag informing whether the wireless power transmitter supports out-band communication to the wireless power receiver through the in-band communication in an identification and configuration phase. The communication/control unit may be configured to perform a procedure for performing a handover to out-band, before entering a power transfer phase that the power pick-up unit transmits the wireless power.

In addition, the procedure for performing the handover to out-band may include receiving information regarding the handover to out-band by the communication/control unit to the wireless power receiver in a negotiation phase, based on the in-band communication.

In addition, the procedure for performing the handover to out-band may include receiving information regarding the handover to out-band by the communication/control unit to the wireless power receiver in a handover phase, based on the in-band communication.

In addition, the information regarding the handover to out-band may include an out-band MAC address packet of the wireless power receiver.

In addition, the procedure for performing the handover to out-band may be initiated by the communication/control unit transmitting a request signal which requests for initiation of the handover to out-band from the wireless power receiver.

In addition, the request signal may be a bit pattern of 8 bits informing the handover to out-band.

In addition, the communication/control unit may be configured to perform the out-band communication with the wireless power receiver in the power transfer phase based on completion of the handover procedure, and receive unique information or bit pattern information for swap detection of the wireless power receiver from the wireless power receiver by using the in-band communication in the power transfer phase.

According to another aspect of the present disclosure, there is provided a method of performing heterogeneous communication by a wireless power receiver configured to receive wireless power from a wireless power transmitter through magnetic coupling with the wireless power transmitter at an operating frequency. The method includes receiving a capability packet including an out-band flag informing whether the wireless power transmitter supports out-band communication using a frequency other than the operating frequency from the wireless power transmitter through in-band communication using the operating frequency in an identification and configuration phase, receiving a request signal which requests for a handover to out-band from the wireless power transmitter, performing the handover to out-band, receiving the wireless power in a power transfer phase, and transmitting identification information for swap detection of the wireless power receiver to the wireless power transmitter by using the in-band communication in the power transfer phase.

Since various communication protocols can be selected depending on a power class between a wireless power transmitter and receiver, various applications of wireless power transmission can be supported.

BRIEF DESCRIPTION OF THE DRAWINGS

FIG. 10 is a structure of a sync pattern according to an embodiment.

FIG. 12 shows a structure of a capability packet of a wireless power transmitter according to an embodiment.

FIG. 13 shows a structure of a configuration packet of a wireless power receiver according to an embodiment.

FIG. 18 shows out-band link information according to an embodiment.

DESCRIPTION OF EXEMPLARY EMBODIMENTS

The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
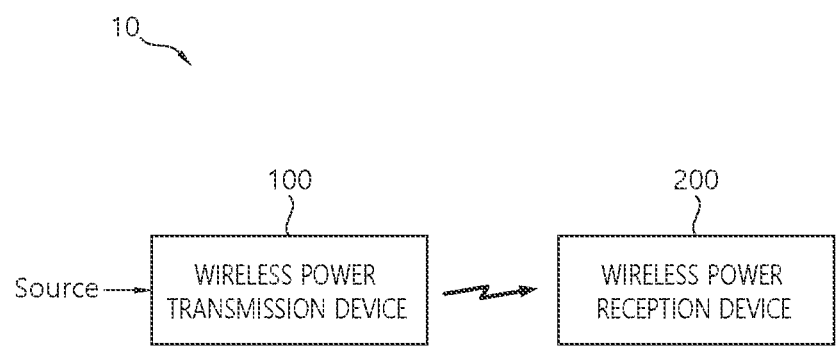
FIG. 1 is a block diagram of a wireless power system (10) according to an embodiment.

FIG. 1 is a block diagram of a wireless power system (10) according to an embodiment.

Referring to FIG. 1, the wireless power system (10) include a wireless power transmitter (100) and a wireless power receiver (200).

The wireless power transmitter (100) is supplied with power from an external power source (S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
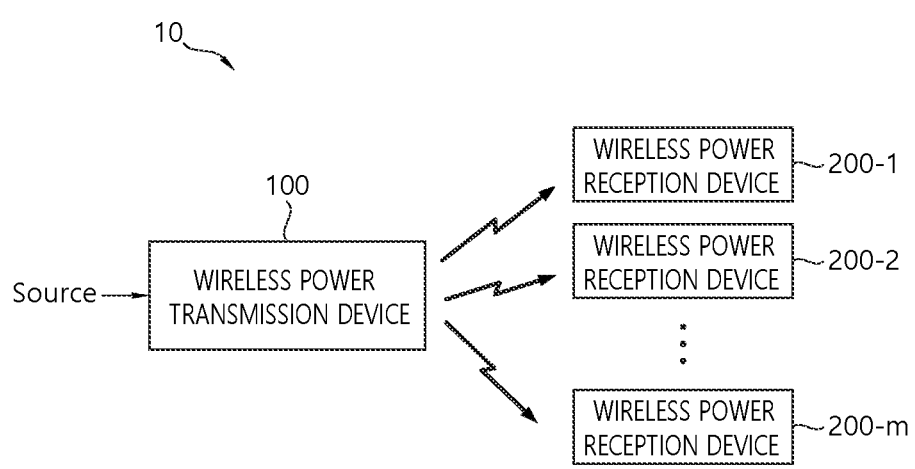
FIG. 2 is a block diagram of a wireless power system (10) according to another embodiment.

In the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figure 3:
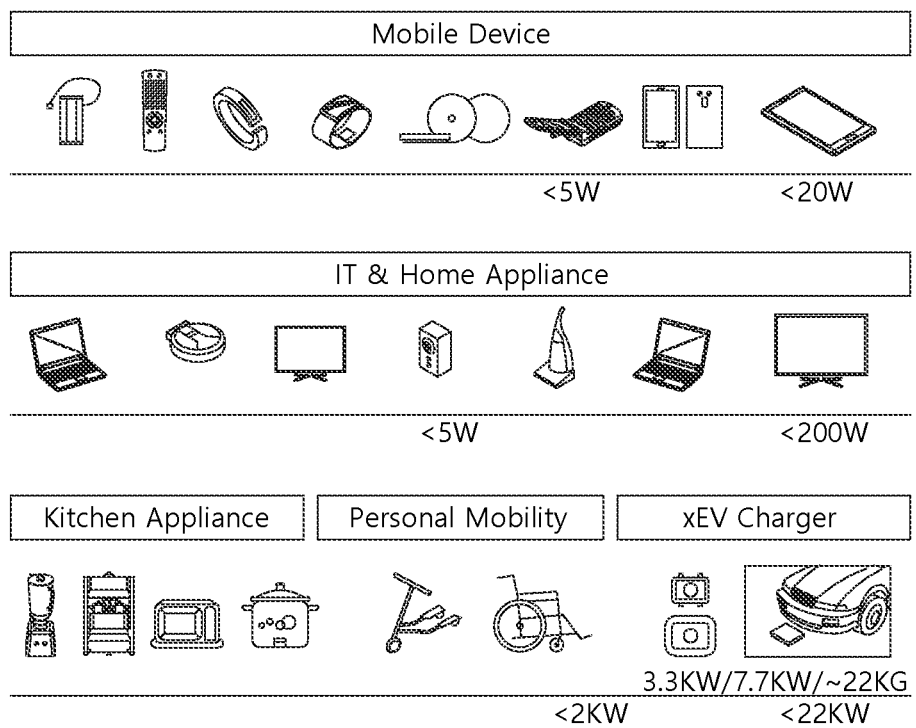
FIG. 3 shows an exemplary embodiment of diverse electronic devices adopting a wireless power transmission system.

FIG. 3 shows an exemplary embodiment of diverse electronic devices adopting a wireless power transmission system.

As shown in FIG. 3, the electronic devices included in the wireless power transmission system are sorted in accordance with the amount of transmitted power and the amount of received power. Referring to FIG. 3, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50 W or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or re-charged) by wirelessly receiving power from a wireless power transmitter.

Hereinafter, although the this specification will be described based on a mobile device adopting the wireless power charging method, this is merely exemplary. And, therefore, it shall be understood that the wireless charging method according to this specification may be applied to diverse electronic devices.

Wireless power transmitters and receivers may provide a very convenient user experience and interface (UX/UI). That is, a smart wireless charging service may be provided, and the smart wireless charging service may be implemented based on a UX/UI of a smartphone including a wireless power transmitter. For these applications, an interface between a processor of a smartphone and a wireless charging receiver allows for "drop and play" two-way communication between the wireless power transmitter and the wireless power receiver.

As an example, a user may experience a smart wireless charging service in a hotel. When the user enters a hotel room and puts a smartphone on a wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when it is detected that wireless power is received, or when the smartphone receives information on the smart wireless charging service from the wireless charger, the smartphone enters a state of inquiring the user about agreement (opt-in) of supplemental features. To this end, the smartphone may display a message on a screen in a manner with or without an alarm sound. An example of the message may include the phrase "Welcome to ### hotel. Select "Yes" to activate smart charging functions: Yes|No Thanks." The smartphone receives an input from the user who selects Yes or No Thanks, and performs a next procedure selected by the user. If Yes is selected, the smartphone transmits corresponding information to the wireless charger. The smartphone and the wireless charger perform the smart charging function together.

The smart wireless charging service may also include receiving WiFi credentials auto-filled. For example, the wireless charger transmits the WiFi credentials to the smartphone, and the smartphone automatically inputs the WiFi credentials received from the wireless charger by running an appropriate application.

The smart wireless charging service may also include running a hotel application that provides hotel promotions or obtaining remote check-in/check-out and contact information.

As another example, the user may experience the smart wireless charging service in a vehicle. When the user gets in the vehicle and puts the smartphone on the wireless charger, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about checking identity.

In this state, the smartphone is automatically connected to the vehicle via WiFi and/or Bluetooth. The smartphone may display a message on the screen in a manner with or without an alarm sound. An example of the message may include a phrase of "Welcome to your car. Select "Yes" to synch device with in-car controls: Yes|No Thanks." Upon receiving the user's input to select Yes or No Thanks, the smartphone performs a next procedure selected by the user. If Yes is selected, the smartphone transmits corresponding information to the wireless charger. In addition, the smartphone and the wireless charger may run an in-vehicle smart control function together by driving in-vehicle application/display software. The user may enjoy the desired music and check a regular map location. The in-vehicle applications/display software may include an ability to provide synchronous access for passers-by.

As another example, the user may experience smart wireless charging at home. When the user enters the room and puts the smartphone on the wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about agreement (opt-in) of supplemental features. To this end, the smartphone may display a message on the screen in a manner with or without an alarm sound. An example of the message may include a phrase such as "Hi xxx, Would you like to activate night mode and secure the building?: Yes|No Thanks." The smartphone receives a user input to select Yes or No Thanks and performs a next procedure selected by the user. If Yes is selected, the smartphone transmits corresponding information to the wireless charger. The smartphones and the wireless charger may recognize at least user's pattern and recommend the user to lock doors and windows, turn off lights, or set an alarm.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5 W, and the EPP is related to a wireless power transmitter and a wireless power receiver supporting the transfer of a power range greater than 5 W and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than 5 W. The application of PC-1 includes wearable devices, such as smart watches.

The PC0 standard relates to wireless power transmitters and receivers providing a guaranteed power of 5 W. The PC0 standard includes an EPP having a guaranteed power ranges that extends to 30 W. Although in-band (IB) communication corresponds to a mandatory communication protocol of PC0, out-of-band (OBB) communication that is used as an optional backup channel may also be used for PC0. The wireless power receiver may be identified by setting up an OOB flag, which indicates whether or not the OOB is supported, within a configuration packet. A wireless power transmitter supporting the OOB may enter an OOB handover phase by transmitting a bit-pattern for an OOB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30 W to 150 W. OOB corresponds to a mandatory communication channel for PC1, and IB is used for initialization and link establishment to OOB. The wireless power transmitter may enter an OOB handover phase by transmitting a bit-pattern for an OOB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transmission/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transmission/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an over-voltage. As a result, it may be inappropriate (or difficult) to use the PS as an index/reference standard representing/indicating the compatibility.

Hereinafter, 'profiles' will be newly defined based on indexes/reference standards representing/indicating the compatibility. More specifically, it may be understood that by maintaining compatibility between wireless power transmitters and receivers having the same 'profile', stable power transmission/reception may be performed, and that power transmission/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 3 different categories, such as i) Mobile, ii) Power tool and iii) Kitchen.

For another example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as D3 and OOB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as D3 communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In case of a power tool and kitchen profile, NFC communication may be used between a wireless power transmitter and receiver. The wireless power transmitter and receiver may exchange a WPC NFC data exchange profile format (NDEF) to mutually confirm that they are NFC devices. For example, the WPC NDEF may include an application profile field (e.g., 1B), a version field (e.g., 1B), and profile specific data (e.g., 1B). The application profile field indicates to which one of: i) mobile and computing; ii) a power tool; and iii) a kitchen, a corresponding device belongs. An upper nibble of the version field indicates a major version, and a lower nibble indicates a minor version. In addition, the profile specific data defines content for the kitchen.

In case of the 'Wearable' profile, the PC may be defined as PC-1, the communication protocol/method may be defined as D3 communication, and the operation frequency may be defined as 87 to 205 kHz, and wearable devices that are worn by the users, and so on, may exist as the exemplary application.

It may be mandatory to maintain compatibility between the same profiles, and it may be optional to maintain compatibility between different profiles.

The above-described profiles (Mobile profile, Power tool profile, Kitchen profile, and Wearable profile) may be generalized and expressed as first to nth profile, and a new profile may be added/replaced in accordance with the WPC standard and the exemplary embodiment.

In case the profile is defined as described above, the wireless power transmitter may optionally perform power transmission only to the wireless power receiving corresponding to the same profile as the wireless power transmitter, thereby being capable of performing a more stable power transmission. Additionally, since the load (or burden) of the wireless power transmitter may be reduced and power transmission is not attempted to a wireless power receiver for which compatibility is not possible, the risk of damage in the wireless power receiver may be reduced.

PC1 of the 'Mobile' profile may be defined by being derived from an optional extension, such as OOB, based on PC0. And, the 'Power tool' profile may be defined as a simply modified version of the PC1 'Mobile' profile. Additionally, up until now, although the profiles have been defined for the purpose of maintaining compatibility between the same profiles, in the future, the technology may be evolved to a level of maintaining compatibility between different profiles. The wireless power transmitter or the wireless power receiver may notify (or announce) its profile to its counterpart by using diverse methods.

In the AFA standard, the wireless power transmitter is referred to as a power transmitting unit (PTU), and the wireless power receiver is referred to as a power receiving unit (PRU). And, the PTU is categorized to multiple classes, as shown in Table 1, and the PRU is categorized to multiple classes, as shown in Table 2.

TABLE 1

|  | $P_{TX\_IN\_MAX}$ | Minimum category support requirement | Minimum value for a maximum number of supported devices |
| --- | --- | --- | --- |
| Class 1 | 2 W | 1× Category 1 | 1× Category 1 |
| Class 2 | 10 W | 1× Category 3 | 2× Category 2 |

TABLE 1-continued

|  | $P_{TX\_IN\_MAX}$ | Minimum category support requirement | Minimum value for a maximum number of supported devices |
| --- | --- | --- | --- |
| Class 3 | 16 W | 1× Category 4 | 2× Category 3 |
| Class 4 | 33 W | 1× Category 5 | 3× Category 3 |
| Class 5 | 50 W | 1× Category 6 | 4× Category 3 |
| Class 6 | 70 W | 1× Category 7 | 5× Category 3 |

TABLE 2

| PRU | $P_{RX\_OUT\_MAX}$ | Exemplary application |
| --- | --- | --- |
| Category 1 | TBD | Bluetooth headset |
| Category 2 | 3.5 W | Feature phone |
| Category 3 | 6.5 W | Smartphone |
| Category 4 | 13 W | Tablet PC, Phablet |
| Category 5 | 25 W | Small form factor laptop |
| Category 6 | 37.5 W | General laptop |
| Category 7 | 50 W | Home appliance |

Figure 4:
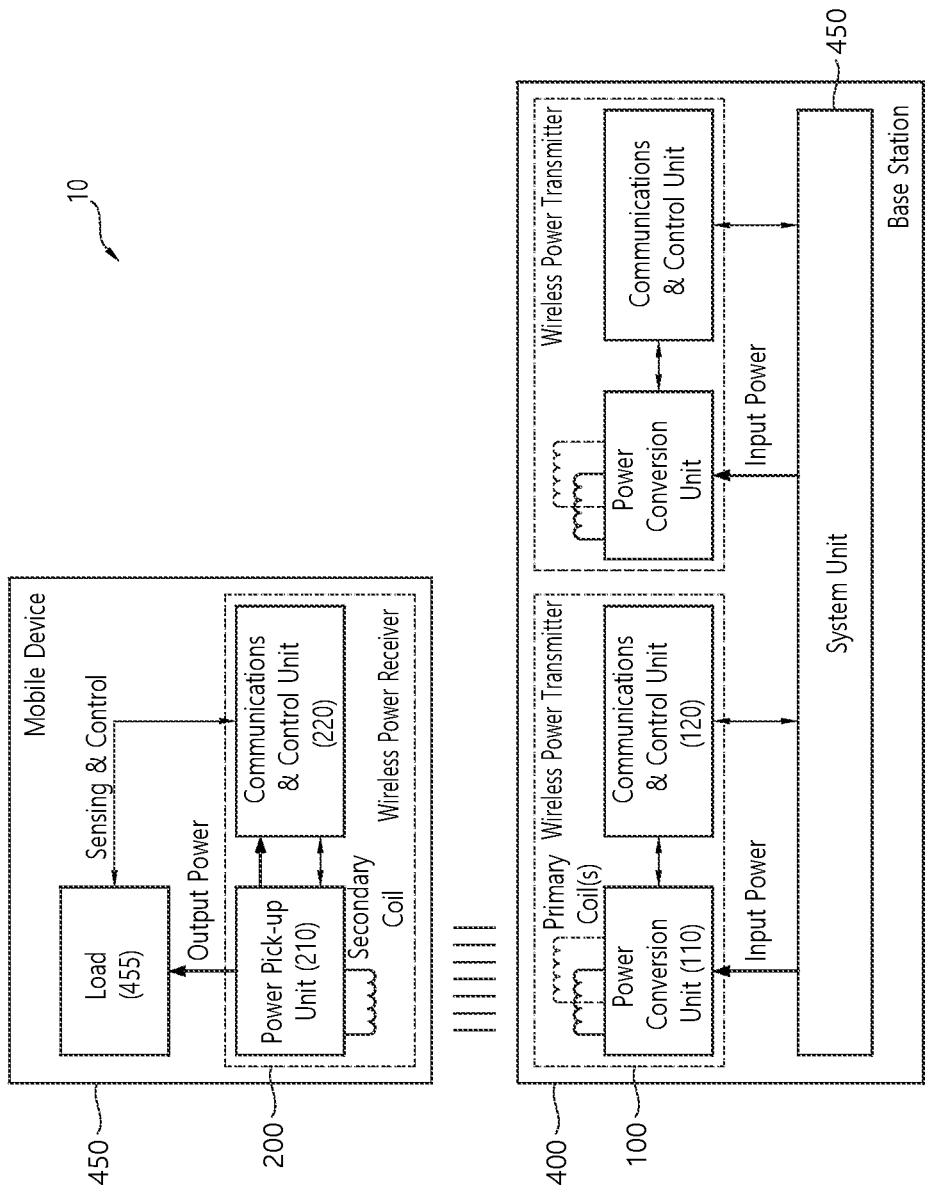
FIG. 4 is a block diagram of a wireless power transmission system according to another embodiment.

As shown in Table 1, a maximum output power capability of Class n PTU may be equal to or greater than the PTX_IN_MAX of the corresponding class. The PRU cannot draw a power that is higher than the power level specified in the corresponding category. FIG. 4 is a block diagram of a wireless power transmission system according to another embodiment.

Referring to FIG. 4, the wireless power transmission system (10) includes a mobile device (450), which wirelessly receives power, and a base station (400), which wirelessly transmits power.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a primary core, a primary winding, a primary loop antenna, and so on.

Meanwhile, the secondary coil may also be referred to as a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (120) may transmit and/or receive information to and from the wireless power receiver (200). The communications & control unit (120) may include at least one of an D3 communication module and an OOB communication module.

The IB communication module may transmit and/or receive information by using a magnetic wave, which uses a specific frequency as its center frequency. For example, the communications & control unit (120) may perform in-band (IB) communication by loading information in the magnetic wave and by transmitting the information through the primary coil or by receiving a magnetic wave carrying information through the primary coil. At this point, the communications & control unit (120) may load information in the magnetic wave or may interpret the information that is carried by the magnetic wave by using a modulation scheme, such as binary phase shift keying (BPSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OOB communication module may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operation point, the communications & control unit (120) may control the transmitted power. The operation point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 4, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220) may include at least one of an D3 communication module and an OOB communication module.

The IB communication module may transmit and/or receive information by using a magnetic wave, which uses a specific frequency as its center frequency. For example, the communications & control unit (220) may perform D3 communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OOB communication module may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

The load (455) may correspond to a battery. The battery may store energy by using the power that is being outputted from the power pick-up unit (210). Meanwhile, the battery is not mandatorily required to be included in the mobile device (450). For example, the battery may be provided as a detachable external feature. As another example, the wireless power receiver may include an operating means that can execute diverse functions of the electronic device instead of the battery.

As shown in the drawing, although the mobile device (450) is illustrated to be included in the wireless power receiver (200) and the base station (400) is illustrated to be included in the wireless power transmitter (100), in a broader meaning, the wireless power receiver (200) may be identified (or regarded) as the mobile device (450), and the wireless power transmitter (100) may be identified (or regarded) as the base station (400).

Hereinafter, the coil or coil unit includes a coil and at least one device being approximate to the coil, and the coil or coil unit may also be referred to as a coil assembly, a coil cell, or a cell.

Figure 5:
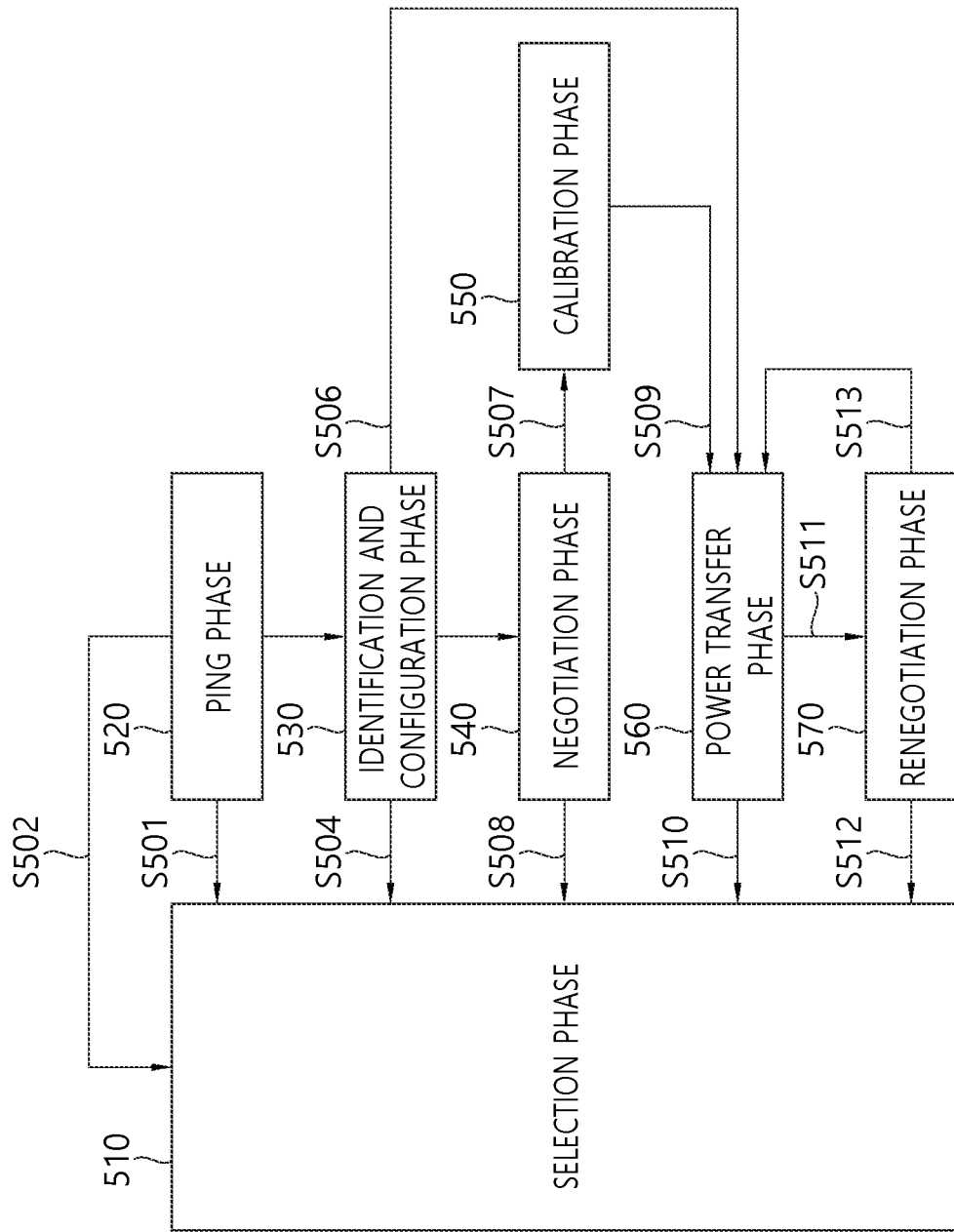
FIG. 5 is a state transition diagram for describing a wireless power transfer procedure.

FIG. 5 is a state transition diagram for describing a wireless power transfer procedure.

Referring to FIG. 5, the power transmission (or transfer) from the wireless power transmitter to the wireless power receiver according to an embodiment may be broadly divided into a selection phase (510), a ping phase (520), an identification and configuration phase (530), a negotiation phase (540), a calibration phase (550), a power transfer phase (560), and a renegotiation phase (570).

If a specific error or a specific event is detected when the power transfer is initiated or while maintaining the power transfer, the selection phase (510) may include a shifting phase (or step)-reference numerals S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit an analog ping having an extremely short pulse and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transmission coil and/or resonance capacitor). According to the embodiment, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value—e.g., depending upon its type, purpose, characteristics, and so on, the wireless power receiver may have a low reference quality factor value-in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the present or absence of a foreign object should be determined by using another method.

According to another embodiment, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) a receiver and transmits a digital ping for identifying whether or not the detected object corresponds to the wireless power receiver. During the ping phase (520), if the wireless power transmitter fails to receive a response signal for the digital ping—e.g., a signal intensity packet—from the receiver, the process may be shifted back to the selection phase (510). Additionally, in the ping phase (520), if the wireless power transmitter receives a signal indicating the completion of the power transfer—e.g., charging complete packet—from the receiver, the process may be shifted back to the selection phase (510).

If the ping phase (520) is completed, the wireless power transmitter may shift to the identification and configuration phase (530) for identifying the receiver and for collecting configuration and status information.

In the identification and configuration phase (530), if the wireless power transmitter receives an unwanted packet (i.e., unexpected packet), or if the wireless power transmitter fails to receive a packet during a predetermined period of time (i.e., out of time), or if a packet transmission error occurs (i.e., transmission error), or if a power transfer contract is not configured (i.e., no power transfer contract), the wireless power transmitter may shift to the selection phase (510).

The wireless power transmitter may confirm (or verify) whether or not its entry to the negotiation phase (540) is needed based on a Negotiation field value of the configuration packet, which is received during the identification and configuration phase (530). Based on the verified result, in case a negotiation is needed, the wireless power transmitter enters the negotiation phase (540) and may then perform a predetermined FOD detection procedure. Conversely, in case a negotiation is not needed, the wireless power transmitter may immediately enter the power transfer phase (560).

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, this specification will not be limited only to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, this specification will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the embodiment may calibrate the threshold value for the FOD detection by applying the estimated power loss.

In the power transfer phase (560), in case the wireless power transmitter receives an unwanted packet (i.e., unexpected packet), or in case the wireless power transmitter fails to receive a packet during a predetermined period of time (i.e., time-out), or in case a violation of a predetermined power transfer contract occurs (i.e., power transfer contract violation), or in case charging is completed, the wireless power transmitter may shift to the selection phase (510).

Additionally, in the power transfer phase (560), in case the wireless power transmitter is required to reconfigure the power transfer contract in accordance with a status change in the wireless power transmitter, the wireless power transmitter may shift to the renegotiation phase (570). At this point, if the renegotiation is successfully completed, the wireless power transmitter may return to the power transfer phase (560).

The above-described power transfer contract may be configured based on the status and characteristic information of the wireless power transmitter and receiver. For example, the wireless power transmitter status information may include information on a maximum amount of transmittable power, information on a maximum number of receivers that can be accommodated, and so on. And, the receiver status information may include information on the required power, and so on.

Figure 6:
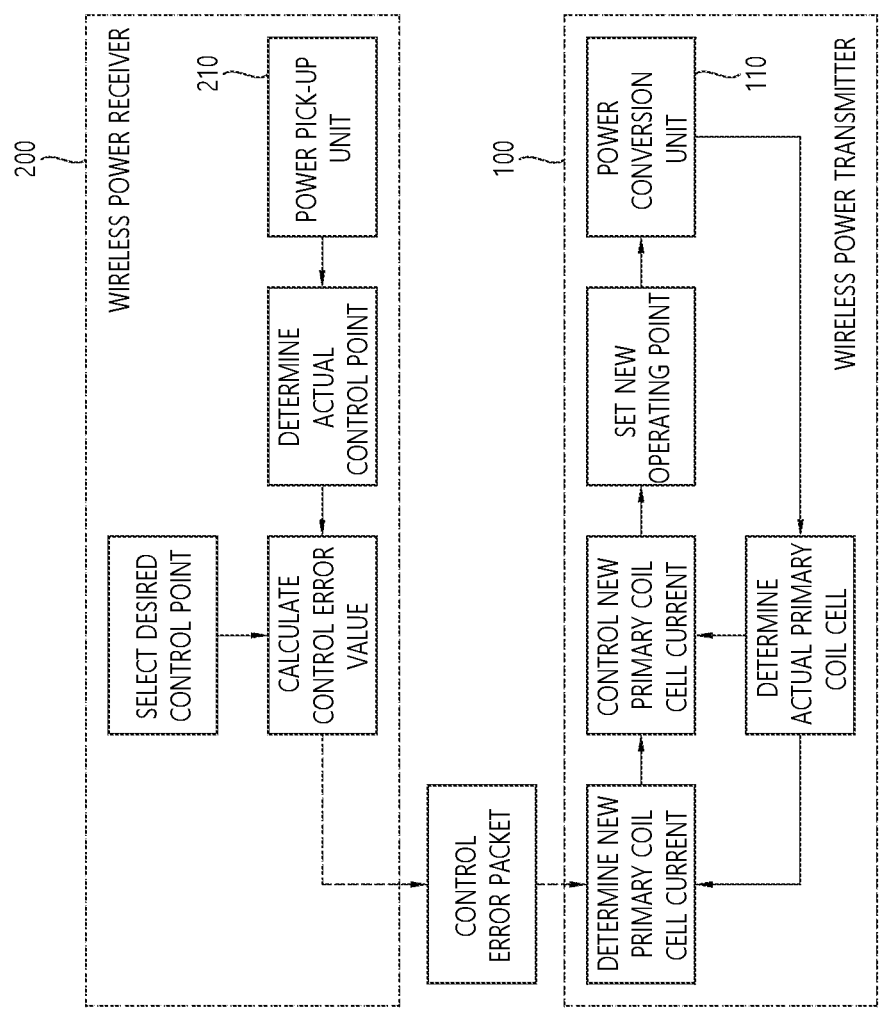
FIG. 6 shows a power control method according to an embodiment.

FIG. 6 shows a power control method according to an embodiment.

As shown in FIG. 6, in the power transfer phase (560), by alternating the power transmission and/or reception and communication, the wireless power transmitter (100) and the wireless power receiver (200) may control the amount (or size) of the power that is being transferred. The wireless power transmitter and the wireless power receiver operate at a specific control point. The control point indicates a combination of the voltage and the electric current that are provided from the output of the wireless power receiver, when the power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operation point-amplitude, frequency, and duty cycle-by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, which will hereinafter be described in detail, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to this specification, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 6 will not be completely excluded. And, additional control of the transmitted power may be performed by using the method of FIG. 6.

Figure 7:
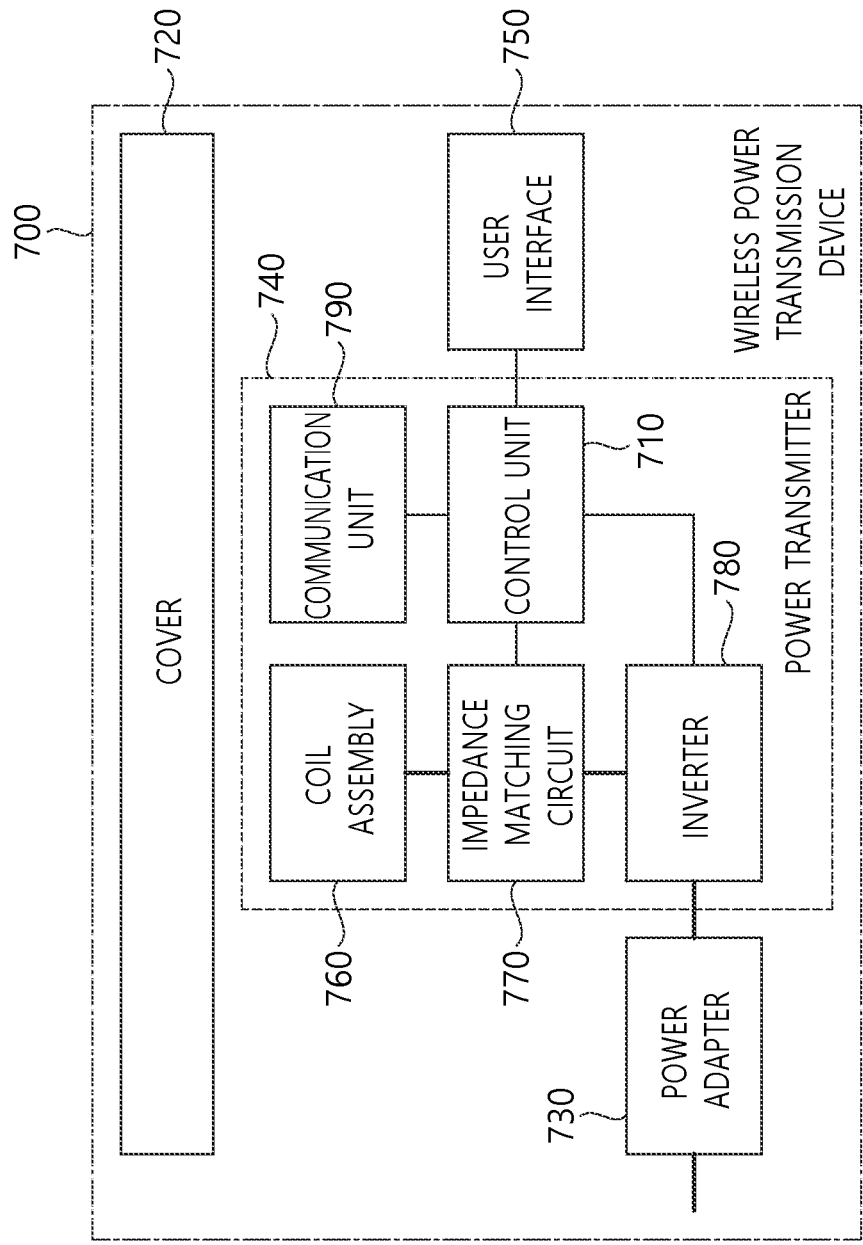
FIG. 7 is a block diagram of a wireless power transmitter according to another embodiment.

FIG. 7 is a block diagram of a wireless power transmitter according to another embodiment. This may belong to a wireless power transmission system that is being operated in the magnetic resonance mode or the shared mode. The shared mode may refer to a mode performing a several-for-one (or one-to-many) communication and charging between the wireless power transmitter and the wireless power receiver. The shared mode may be implemented as a magnetic induction method or a resonance method.

Referring to FIG. 7, the wireless power transmitter (700) may include at least one of a cover (720) covering a coil assembly, a power adapter (730) supplying power to the power transmitter (740), a power transmitter (740) transmitting wireless power, and a user interface (750) providing information related to power transfer processing and other related information. Most particularly, the user interface (750) may be optionally included or may be included as another user interface (750) of the wireless power transmitter (700).

The power transmitter (740) may include at least one of a coil assembly (760), an impedance matching circuit (770), an inverter (780), a communication unit (790), and a control unit (710).

The coil assembly (760) includes at least one primary coil generating a magnetic field. And, the coil assembly (760) may also be referred to as a coil cell.

The impedance matching circuit (770) may provide impedance matching between the inverter and the primary coil(s). The impedance matching circuit (770) may generate resonance from a suitable frequency that boosts the electric current of the primary coil(s). In a multi-coil power transmitter (740), the impedance matching circuit may additionally include a multiplex that routes signals from the inverter to a subset of the primary coils. The impedance matching circuit may also be referred to as a tank circuit.

The impedance matching circuit (770) may include a capacitor, an inductor, and a switching device that switches the connection between the capacitor and the inductor. The impedance matching may be performed by detecting a reflective wave of the wireless power that is being transferred (or transmitted) through the coil assembly (760) and by switching the switching device based on the detected reflective wave, thereby adjusting the connection status of the capacitor or the inductor or adjusting the capacitance of the capacitor or adjusting the inductance of the inductor. In some cases, the impedance matching may be carried out even though the impedance matching circuit (770) is omitted. This specification also includes an exemplary embodiment of the wireless power transmitter (700), wherein the impedance matching circuit (770) is omitted.

The inverter (780) may convert a DC input to an AC signal. The inverter (780) may be operated as a half-bridge inverter or a full-bridge inverter in order to generate a pulse wave and a duty cycle of an adjustable frequency. Additionally, the inverter may include a plurality of stages in order to adjust input voltage levels.

The communication unit (790) may perform communication with the power receiver. The power receiver performs load modulation in order to communicate requests and information corresponding to the power transmitter. Therefore, the power transmitter (740) may use the communication unit (790) so as to monitor the amplitude and/or phase of the electric current and/or voltage of the primary coil in order to demodulate the data being transmitted from the power receiver.

Additionally, the power transmitter (740) may control the output power to that the data can be transferred through the communication unit (790) by using a Frequency Shift Keying (FSK) method, and so on.

The control unit (710) may control communication and power transfer (or delivery) of the power transmitter (740). The control unit (710) may control the power transfer by adjusting the above-described operation point. The operation point may be determined by, for example, at least any one of the operation frequency, the duty cycle, and the input voltage.

The communication unit (790) and the control unit (710) may each be provided as a separate unit/device/chipset or may be collectively provided as one unit/device/chipset.

Figure 8:
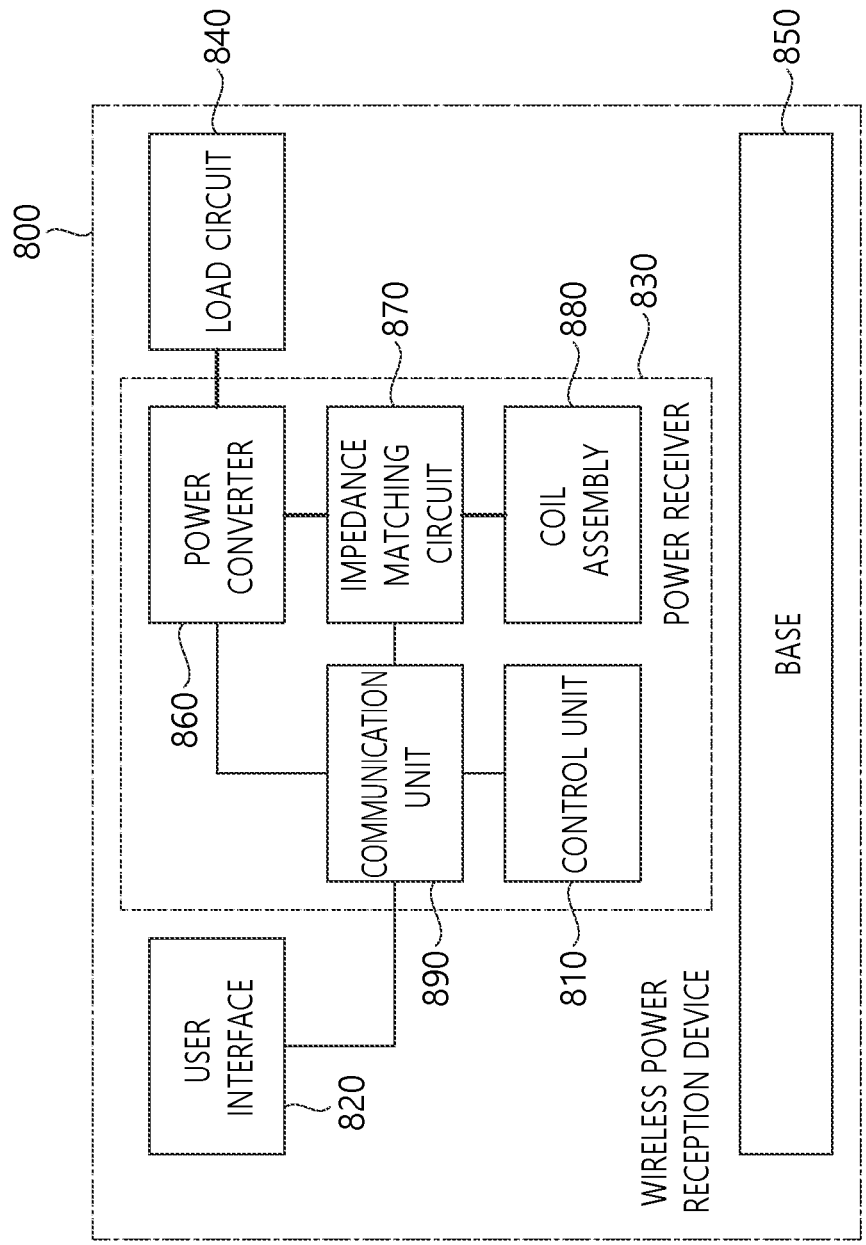
FIG. 8 shows a wireless power receiver according to another embodiment.

FIG. 8 shows a wireless power receiver according to another embodiment. This may belong to a wireless power transmission system that is being operated in the magnetic resonance mode or the shared mode.

Referring to FIG. 8, the wireless power receiver (800) may include at least one of a user interface (820) providing information related to power transfer processing and other related information, a power receiver (830) receiving wireless power, a load circuit (840), and a base (850) supporting and covering the coil assembly. Most particularly, the user interface (820) may be optionally included or may be included as another user interface (820) of the wireless power receiver (800).

The power receiver (830) may include at least one of a power converter (860), an impedance matching circuit (870), a coil assembly (880), a communication unit (890), and a control unit (810).

The power converter (860) may convert the AC power that is received from the secondary coil to a voltage and electric current that are suitable for the load circuit. According to an exemplary embodiment, the power converter (860) may include a rectifier. The rectifier may rectify the received wireless power and may convert the power from an alternating current (AC) to a direct current (DC). The rectifier may convert the alternating current to the direct current by using a diode or a transistor, and, then, the rectifier may smooth the converted current by using the capacitor and resistance. Herein, a full-wave rectifier, a half-wave rectifier, a voltage multiplier, and so on, that are implemented as a bridge circuit may be used as the rectifier. Additionally, the power converter may adapt a reflected impedance of the power receiver.

The impedance matching circuit (870) may provide impedance matching between a combination of the power converter (860) and the load circuit (840) and the secondary coil. According to an exemplary embodiment, the impedance matching circuit may generate a resonance of approximately 100 kHz, which can reinforce the power transfer. The impedance matching circuit (870) may include a capacitor, an inductor, and a switching device that switches the combination of the capacitor and the inductor. The impedance matching may be performed by controlling the switching device of the circuit that configured the impedance matching circuit (870) based on the voltage value, electric current value, power value, frequency value, and so on, of the wireless power that is being received. In some cases, the impedance matching may be carried out even though the impedance matching circuit (870) is omitted. This specification also includes an exemplary embodiment of the wireless power receiver (200), wherein the impedance matching circuit (870) is omitted.

The coil assembly (880) includes at least one secondary coil, and, optionally, the coil assembly (880) may further include an element shielding the metallic part of the receiver from the magnetic field.

The communication unit (890) may perform load modulation in order to communicate requests and other information to the power transmitter.

For this, the power receiver (830) may perform switching of the resistance or capacitor so as to change the reflected impedance.

The control unit (810) may control the received power. For this, the control unit (810) may determine/calculate a difference between an actual operation point and a desired operation point of the power receiver (830). Thereafter, by performing a request for adjusting the reflected impedance of the power transmitter and/or for adjusting an operation point of the power transmitter, the difference between the actual operation point and the desired operation point may be adjusted/reduced. In case of minimizing this difference, an optimal power reception may be performed.

The communication unit (890) and the control unit (810) may each be provided as a separate device/chipset or may be collectively provided as one device/chipset.

Figure 9:
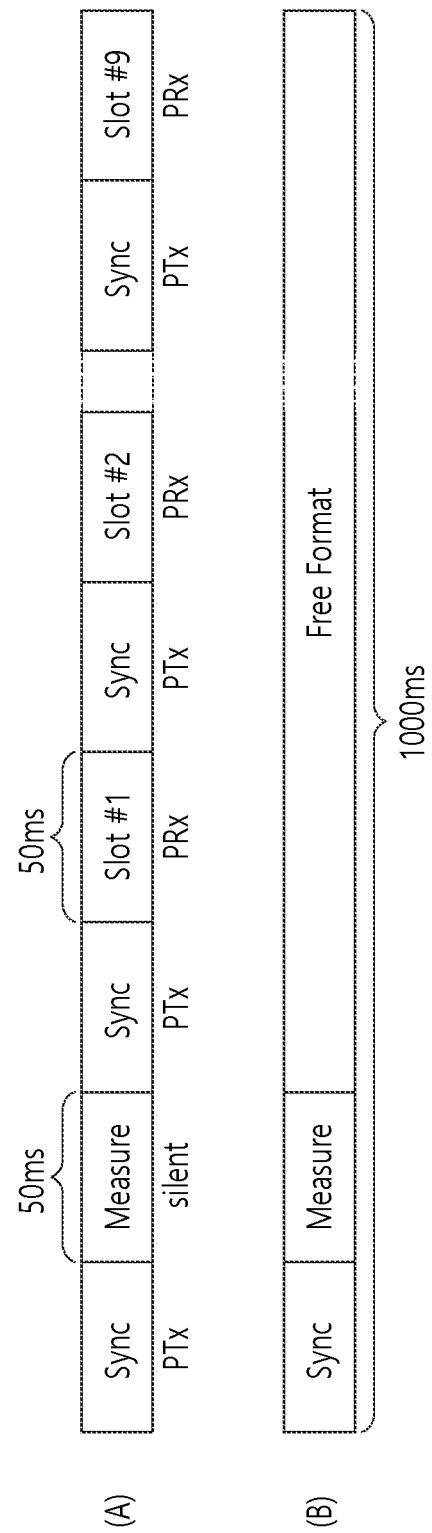
FIG. 9 shows a communication frame structure according to an embodiment.

FIG. 9 shows a communication frame structure according to an embodiment. This may correspond to a communication frame structure in a shared mode.

Referring to FIG. 9, in the shared mode, different forms of frames may be used along with one another. For example, in the shared mode, a slotted frame having a plurality of slots, as shown in (A), and a free format frame that does not have a specified format, as shown in (B), may be used. More specifically, the slotted frame corresponds to a frame for transmitting short data packets from the wireless power receiver (200) to the wireless power transmitter (100). And, since the free format frame is not configured of a plurality of slots, the free format frame may correspond to a frame that is capable of performing transmission of long data packets.

Meanwhile, the slotted frame and the free format frame may be referred to other diverse terms by anyone skilled in the art. For example, the slotted frame may be alternatively referred to as a channel frame, and the free format frame may be alternatively referred to as a message frame.

More specifically, the slotted frame may include a sync pattern indicating the starting point (or beginning) of a slot, a measurement slot, nine slots, and additional sync patterns each having the same time interval that precedes each of the nine slots.

Herein, the additional sync pattern corresponds to a sync pattern that is different from the sync pattern that indicates the starting point of the above-described frame. More specifically, the additional sync pattern does not indicate the starting point of the frame but may indicate information related to the neighboring (or adjacent) slots (i.e., two consecutive slots positioned on both sides of the sync pattern).

Among the nine slots, each sync pattern may be positioned between two consecutive slots. In this case, the sync pattern may provide information related to the two consecutive slots.

Additionally, the nine slots and the sync patterns being provided before each of the nine slots may have the same time interval. For example, the nine slots may have a time interval of 50 ms. And, the nine sync patterns may have a time length of 50 ms.

Meanwhile, the free format frame, as shown in (B) may not have a specific format apart from the sync pattern indicating the starting point of the frame and the measurement slot. More specifically, the free format frame is configured to perform a function that is different from that of the slotted frame. For example, the free format frame may be used to perform a function of performing communication of long data packets (e.g., additional owner information packets) between the wireless power transmitter and the wireless power receiver, or, in case of a wireless power transmitter being configured of multiple coils, to perform a function of selecting any one of the coils.

Hereinafter, a sync pattern that is included in each frame will be described in more detail with reference to the accompanying drawings.

FIG. 10 is a structure of a sync pattern according to an embodiment.

Referring to FIG. 10, the sync pattern may be configured of a preamble, a start bit, a response field, a type field, an info field, and a parity bit. In FIG. 10, the start bit is illustrated as ZERO.

More specifically, the preamble is configured of consecutive bits, and all of the bits may be set to 0. In other words, the preamble may correspond to bits for matching a time length of the sync pattern.

The number of bits configuring the preamble may be subordinate to the operation frequency so that the length of the sync pattern can be most approximate to 50 ms but within a range that does not exceed 50 ms. For example, in case the operation frequency corresponds to 100 kHz, the sync pattern may be configured of two preamble bits, and, in case the operation frequency corresponds to 105 kHz, the sync pattern may be configured of three preamble bits.

The start bit may correspond to a bit that follows the preamble, and the start bit may indicate ZERO. The ZERO may correspond to a bit that indicates a type of the sync pattern. Herein, the type of sync patterns may include a frame sync including information that is related to a frame, and a slot sync including information of the slot. More specifically, the sync pattern may be positioned between consecutive frames and may correspond to a frame sync that indicate a start of the frame, or the sync pattern may be positioned between consecutive slots among a plurality of slots configuring the frame and may correspond to a sync slot including information related to the consecutive slots.

For example, in case the ZERO is equal to 0, this may indicate that the corresponding slot is a slot sync that is positioned in-between slots. And, in case the ZERO is equal to 1, this may indicate that the corresponding sync pattern is a frame sync being located in-between frames.

A parity bit corresponds to a last bit of the sync pattern, and the parity bit may indicate information on a number of bits configuring the data fields (i.e., the response field, the type field, and the info field) that are included in the sync pattern. For example, in case the number of bits configuring the data fields of the sync pattern corresponds to an even number, the parity bit may be set to when, and, otherwise (i.e., in case the number of bits corresponds to an odd number), the parity bit may be set to 0.

The response field may include response information of the wireless power transmitter for its communication with the wireless power receiver within a slot prior to the sync pattern. For example, in case a communication between the wireless power transmitter and the wireless power receiver is not detected, the response field may have a value of '00'. Additionally, if a communication error is detected in the communication between the wireless power transmitter and the wireless power receiver, the response field may have a value of '01'. The communication error corresponds to a case where two or more wireless power receivers attempt to access one slot, thereby causing collision to occur between the two or more wireless power receivers.

Additionally, the response field may include information indicating whether or not the data packet has been accurately received from the wireless power receiver. More specifically, in case the wireless power transmitter has denied the data packet, the response field may have a value of "10" (10—not acknowledge (NAK)). And, in case the wireless power transmitter has confirmed the data packet, the response field may have a value of "11" (11—acknowledge (ACK)).

The type field may indicate the type of the sync pattern. More specifically, in case the sync pattern corresponds to a first sync pattern of the frame (i.e., as the first sync pattern, in case the sync pattern is positioned before the measurement slot), the type field may have a value of '1', which indicates a frame sync.

Additionally, in a slotted frame, in case the sync pattern does not correspond to the first sync pattern of the frame, the type field may have a value of '0', which indicates a slot sync.

Moreover, the information field may determine the meaning of its value in accordance with the sync pattern type, which is indicated in the type field. For example, in case the type field is equal to 1 (i.e., in case the sync pattern type indicates a frame sync), the meaning of the information field may indicate the frame type. More specifically, the information field may indicate whether the current frame corresponds to a slotted frame or a free-format frame. For example, in case the information field is given a value of '00', this indicates that the current frame corresponds to a slotted frame. And, in case the information field is given a value of '01', this indicates that the current frame corresponds to a free-format frame.

Conversely, in case the type field is equal to 0 (i.e., in case the sync pattern type indicates a slot sync), the information field may indicate a state of a next slot, which is positioned after the sync pattern. More specifically, in case the next slot corresponds to a slot that is allocated (or assigned) to a specific wireless power receiver, the information field is given a value of '00'. In case the next slot corresponds to a slot that is locked, so as to be temporarily used by the specific wireless power receiver, the information field is given a value of '01'. Alternatively, in case the next slot corresponds to a slot that can be freely used by a random wireless power receiver, the information field is given a value of '10'.

Figure 11:
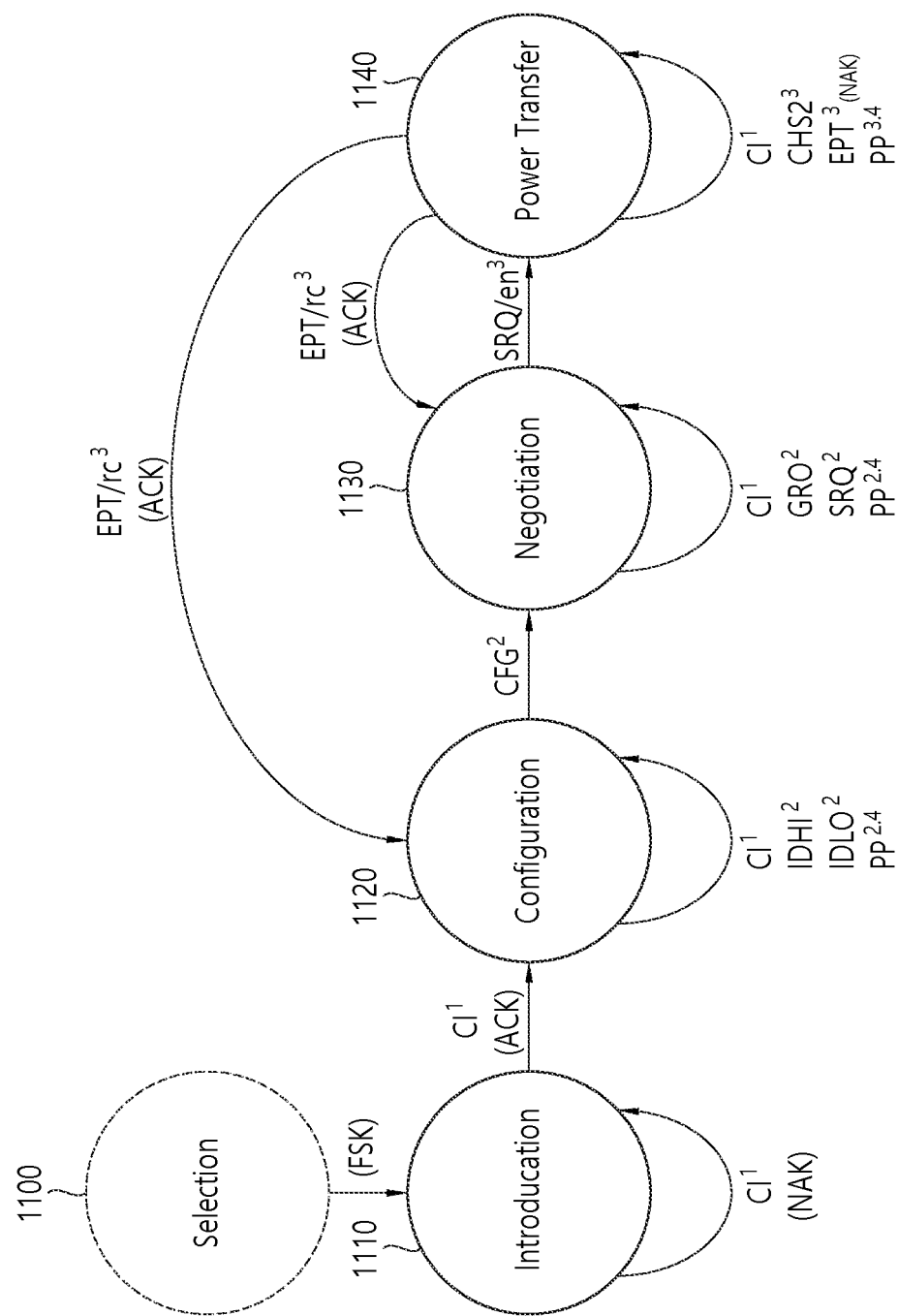
FIG. 11 shows operation statuses of a wireless power transmitter and a wireless power receiver in a shared mode according to an embodiment.

FIG. 11 shows operation statuses of a wireless power transmitter and a wireless power receiver in a shared mode according to an embodiment.

Referring to FIG. 11, the wireless power receiver operating in the shared mode may be operated in any one of a selection phase (1100), an introduction phase (1110), a configuration phase (1120), a negotiation phase (1130), and a power transfer phase (1140).

Firstly, the wireless power transmitter according to the embodiment may transmit a wireless power signal in order to detect the wireless power receiver. More specifically, a process of detecting a wireless power receiver by using the wireless power signal may be referred to as an Analog ping.

Meanwhile, the wireless power receiver that has received the wireless power signal may enter the selection phase (1100). As described above, the wireless power receiver that has entered the selection phase (1100) may detect the presence or absence of an FSK signal within the wireless power signal.

In other words, the wireless power receiver may perform communication by using any one of an exclusive mode and a shared mode in accordance with the presence or absence of the FSK signal.

More specifically, in case the FSK signal is included in the wireless power signal, the wireless power receiver may operate in the shared mode, and, otherwise, the wireless power receiver may operate in the exclusive mode.

In case the wireless power receiver operates in the shared mode, the wireless power receiver may enter the introduction phase (1110). In the introduction phase (1110), the wireless power receiver may transmit a control information (CI) packet to the wireless power transmitter in order to transmit the control information packet during the configuration phase, the negotiation phase, and the power transfer phase. The control information packet may have a header and information related to control. For example, in the control information packet, the header may correspond to 0X53.

In the introduction phase (1110), the wireless power receiver performs an attempt to request a free slot for transmitting the control information (CI) packet during the following configuration phase, negotiation phase, and power transfer phase. At this point, the wireless power receiver selects a free slot and transmits an initial CI packet. If the wireless power transmitter transmits an ACK as a response to the corresponding CI packet, the wireless power transmitter enters the configuration phase. If the wireless power transmitter transmits a NACK as a response to the corresponding CI packet, this indicates that another wireless power receiver is performing communication through the configuration and negotiation phase. In this case, the wireless power receiver re-attempts to perform a request for a free slot.

If the wireless power receiver receives an ACK as a response to the CI packet, the wireless power receiver may determine the position of a private slot within the frame by counting the remaining sync slots up to the initial frame sync. In all of the subsequent slot-based frames, the wireless power receiver transmits the CI packet through the corresponding slot.

If the wireless power transmitter authorizes the entry of the wireless power receiver to the configuration phase, the wireless power transmitter provides a locked slot series for the exclusive usage of the wireless power receiver. This may ensure the wireless power receiver to proceed to the configuration phase without any collision.

The wireless power receiver transmits sequences of data packets, such as two identification data packets (IDHI and IDLO), by using the locked slots. When this phase is completed, the wireless power receiver enters the negotiation phase. During the negotiation state, the wireless power transmitter continues to provide the locked slots for the exclusive usage of the wireless power receiver. This may ensure the wireless power receiver to proceed to the negotiation phase without any collision.

The wireless power receiver transmits one or more negotiation data packets by using the corresponding locked slot, and the transmitted negotiation data packet(s) may be mixed with the private data packets. Eventually, the corresponding sequence is ended (or completed) along with a specific request (SRQ) packet. When the corresponding sequence is completed, the wireless power receiver enters the power transfer phase, and the wireless power transmitter stops the provision of the locked slots.

In the power transfer phase, the wireless power receiver performs the transmission of a CI packet by using the allocated slots and then receives the power. The wireless power receiver may include a regulator circuit. The regulator circuit may be included in a communication/control unit. The wireless power receiver may self-regulate a reflected impedance of the wireless power receiver through the regulator circuit. In other words, the wireless power receiver may adjust the impedance that is being reflected for an amount of power that is requested by an external load. This may prevent an excessive reception of power and overheating.

In the shared mode, (depending upon the operation mode) since the wireless power transmitter may not perform the adjustment of power as a response to the received CI packet, in this case, control may be needed in order to prevent an overvoltage state.

In the wireless power transmission system, communication between a wireless power transmitter and receiver generally uses an amplitude shift keying (ASK) using a magnetic field change and frequency shift keying (FSK) using a frequency change. However, since the ASK and the FSK have a transfer rate of only a few kHz and are vulnerable to electrical and magnetic disturbances, the ASK or the FSK is not suitable for medium power level transmission required in an evolved wireless power transmission system or massive data transmission such as authentication. Therefore, a method for selecting various communication protocols between the wireless power transmitter and receiver is required to support various applications of wireless power transmission. In the present specification, out-band communication differs from out-of-band (OOB) communication only in terms of expression and is substantially the same term. Therefore, it will be collectively described hereinafter as out-band communication.

Hereinafter, a switching operation between in-band communication and out-band communication is called a handover. In particular, an operation in which a wireless power transmitter and receiver switch from the in-band communication to the out-band communication is called a handover to out-band, and an operation in which the wireless power transmitter and receiver switch from the out-band communication to the in-band communication is called a handover to in-band. The out-band communication may include, for example, Bluetooth or Bluetooth low energy (BLE) or NFC.

In order to enable the handover to out-band, both the wireless power transmitter and receiver shall not only support the out-band communication but also know whether the out-band communication is possible in the other party. Whether the wireless power transmitter and receiver support the out-band communication may be checked by a corresponding power class and information on whether the out-band communication is supported. In addition, if the handover to out-band is possible, a procedure or packet for determining (or selecting) and initiating the handover to out-band shall be defined. Hereinafter, information, packet, and procedure related to the handover to out-band will be disclosed.

Information and Packet Related to Handover to Out-Band

In an aspect, whether a wireless power transmitter supports out-band communication may be determined by a capability packet. The capability packet is a packet which is transmitted by the wireless power transmitter during a negotiation phase in response to a general request of a wireless power receiver. The capability packet may include power class information and a flag indicating whether the out-band communication is supported. In addition, whether the out-band communication is selected may be indicated by the flag of the capability packet.

FIG. 12 shows a structure of a capability packet of a wireless power transmitter according to an embodiment.

Referring to FIG. 12, the capability packet may be indicated by a header value of 0x31, and may include a power class bit/field (e.g., 2 bits), a guaranteed power value bit/field (e.g., 6 bits), a potential power value bit/field (e.g., 6 bits), an out-band (OOB) flag field (e.g., 1 bit), a wireless power identifier (WPID) bit/field (e.g., 1 bit), and/or a Not Res Sens. bit/field (e.g., 1 bit).

The power class bit/field indicates PC of a power transmitting unit.

The guaranteed power value bit/field indicates a maximum guaranteed power value included in a power transfer contract (PTC-GP) that may be negotiated by the power transmitting unit in a current surrounding condition. Herein, the surrounding condition may correspond to, for example, a temperature of the power transmitting unit, an amount of power that may be drained by the power transmitting unit from a power source shared with other power transmitting units, and/or the presence or absence of a foreign object or friendly metal.

The OOB flag field is a field indicating whether the wireless power transmitter supports out-band communication, and for example, may indicate that the wireless power transmitter supports the out-band communication if a value thereof is '1'b, and may indicate that the wireless power transmitter does not support out-band communication if the value thereof is '0'b.

The WPID bit/field indicates that the power transmitting unit has no ability to receive a WPID packet. The Not Res Sens. bit/field may be set to a different value for each design of an individual power transmitting unit. In general, this bit/field may be set to a value '0' to indicate a design of a power transmitting unit capable of frequency control of less than 150 kHz with a power transfer contract including a maximum power value greater than 5 W.

During the negotiation phase, the wireless power receiver may receive and read the capability packet of the wireless power transmitter to identify whether the wireless power transmitter supports out-band communication. When the out-band communication is selected by the capability packet during the negotiation phase, a handover to out-band may be performed.

In another aspect, whether the wireless power receiver supports out-band communication may be determined by a configuration packet. Herein, the configuration packet is information generated by the wireless power receiver and transmitted to the wireless power transmitter, and may include an out-band flag (or OOB flag) indicating whether the wireless power receiver supports the out-band communication. The wireless power receiver may set the out-band flag in the configuration packet to indicate that the wireless power receiver supports the out-band communication.

FIG. 13 shows a structure of a configuration packet of a wireless power receiver according to an embodiment.

Referring to FIG. 13, the configuration packet may be indicated by a header value of 0x51, and may include a power class bit/field (e.g., 2 bits), a maximum power value bit/field (e.g., 6 bits), an out-band flag field (e.g., 1 bit), a prop bit/field (e.g., 1 bit), a count bit/field (e.g., 3 bit)s, a window size bit/field (e.g., 5 bits), a window offset bit/field (e.g., 5 bits), a window offset bit/field (e.g., 3 bits), a Neg bit/field (e.g., 1 bit), a polarity bit/field (e.g., 1 bit), and/or a depth bit/field (e.g., 2 bits).

The power class bit/field indicates PC of a power receiving unit.

The maximum power value bit/field may indicate different information according to whether the power receiving unit supports a foreign object detection (FOD) (extension) function. If the power receiving unit does not support the FOD extension function, this bit/field may indicate a maximum power amount which is expected to be provided to the power receiving unit from a power transmitting unit/rectifier. If the power receiving unit supports the FOD extension function, this bit/field may indicate a scaling factor of a received power value reported by the power receiving unit by using a received power packet. In this case, the power receiving unit may set this bit/field to a value twice the maximum power amount (watt) expected to be provided.

The out-band flag field is a field indicating whether the wireless power receiver supports or does not support out-band communication, and for example, may indicate that the wireless power receiver supports the out-band communication if a value thereof is '1'b, and may indicate that the wireless power receiver does not support the out-band communication if the value thereof is '0'b.

The prop bit/field may indicate a power transfer control scheme of the power transmitting unit, which is desired by the power receiving unit.

If the Neg bit/field is set to '0', this may indicate that no response is transmitted by the power transmitting unit. If this bit/field is set to '1', this may indicate that the power transmitting unit has to transmit an Acknowledge (ACK) response to the power receiving unit after a configuration packet indicating entering a negotiation phase.

If the polarity bit/field is set to '0', this may indicate that the power transmitting unit uses a default FSK polarity. If this bit/field is set to '1', this may indicate that the power transmitting unit uses a revered FSK polarity.

The depth bit/field may indicate a depth of FSK modulation.

The count bit/field may indicate the number of optional configuration packets transmitted by the power receiving unit in the identification/configuration phase.

The window size bit/field may indicate an averaged window size of received power in unit of 4 ms.

The window offset bit/field may indicate a time interval between a window for averaging received power and received power packet transmission in unit of 4 ms.

In another aspect, a handover to out-band may be requested or initiated by a bit-pattern for OOB handover.

Figure 14:
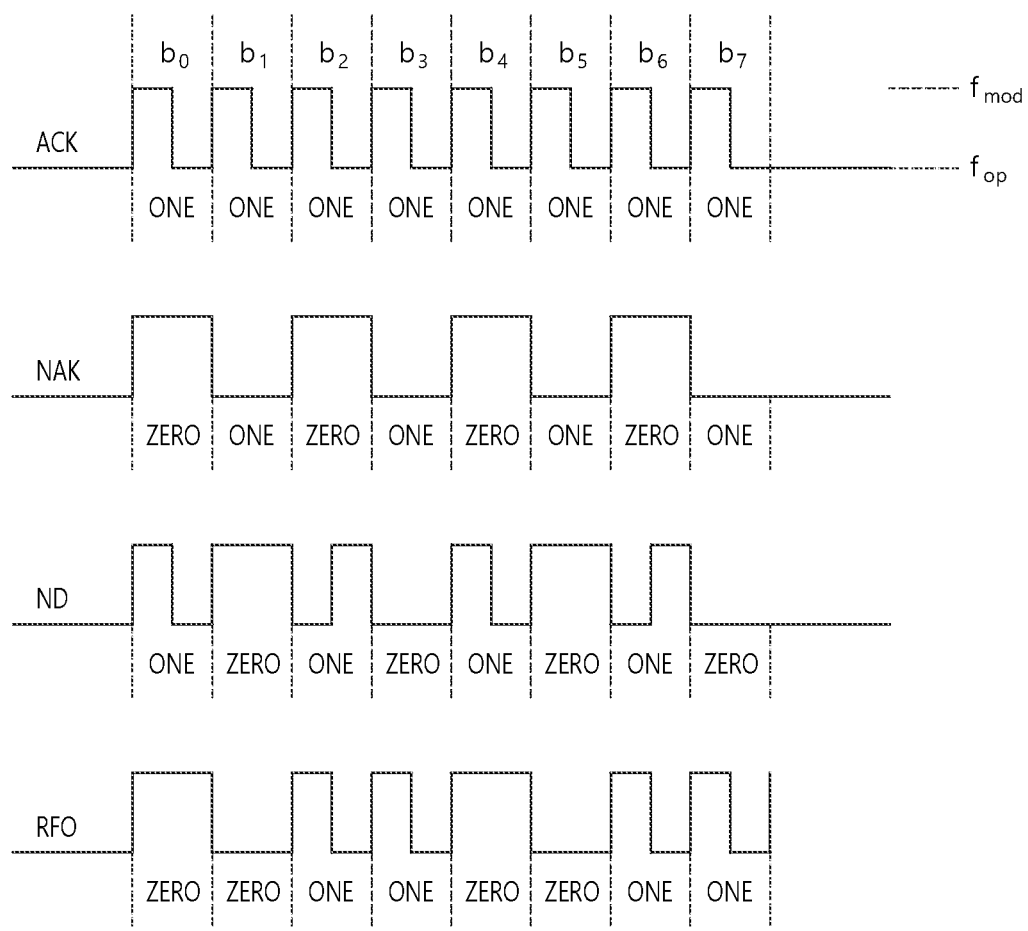
FIG. 14 is a drawing illustrating a bit pattern used in a handover request to out-band according to an embodiment.

FIG. 14 is a drawing illustrating a bit pattern used in a handover request to out-band according to an embodiment.

Referring to FIG. 14, upon confirming that a wireless power receiver supports out-band communication, a wireless power transmitter may request for a handover to out-band by transmitting a specific bit pattern (e.g., 8 bits as shown in FIG. 14) to the wireless power receiver in response thereto. Herein, the bit pattern may re-utilize the existing NAK(00000000) or ND(10101010), and may be a newly defined value (e.g., 00110011) as a response for a configuration packet of the wireless power receiver.

The wireless power transmitter according to the embodiment of FIG. 12 to FIG. 14 corresponds to the wireless power transmitter, wireless power transmitting unit, or power transmitting portion of FIG. 1 to FIG. 11. Therefore, an operation of the wireless power transmitter in the present embodiment is implemented by combining one or two or more of components of the wireless power transmitter of FIG. 1 to FIG. 11. For example, in the present embodiment, an operation of generating and transmitting a capability packet, an operation of selecting out-band communication and performing a handover, an operation of generating and transmitting a bit pattern for handover, an operation of requesting for a handover to out-band, an operation of receiving a configuration packet, or the like may be performed by the communication/control unit 120.

In addition, the wireless power receiver according to the embodiment of FIG. 12 to FIG. 14 corresponds to the wireless power receiver, wireless power receiving unit, or power receiving portion of FIG. 1 to FIG. 11. Therefore, an operation of the wireless power receiver in the present embodiment is implemented by combining one or two or more of components of the wireless power receiver of FIG. 1 to FIG. 11. For example, in the present embodiment, an operation of checking whether the wireless power transmitter supports out-band communication by receiving and reading a capability packet of the wireless power transmitter, an operation of checking whether the wireless power transmitter support the out-band communication, an operation of selecting the out-band communication and performing handover, an operation of generating and transmitting a configuration packet, an operation of receiving a bit pattern for handover, or the like may be performed by the communication/control unit 220.

Procedure of Handover to Out-Band

Hereinafter, a method in which a wireless power transmitter and a wireless power receiver perform a procedure for performing a handover to out-band is disclosed in detail.

The wireless power transmitter and receiver may mutually exchange a packet by using a specific communication method according to a power class (PC) or according to a phase.

If at least one of the wireless power transmitter and receiver belongs to the PC, in-band communication may be mandatory while out-band communication may be optional. That is, the out-band communication may be used as an optional backup channel.

If the wireless power transmitter and receiver belong to PC1, both the in-band communication and the out-band communication may be mandatory. In this case, the wireless power transmitter and/or the wireless power receiver may perform a handover to out-band communication after starting in-band communication in an initial stage. In this case, the handover to out-band may be achieved through in-band communication. In other words, the in-band communication is used for charging initialization and link establishment to OOB.

In case of the PC1, since out-band communication is mandatory, the PC1 wireless power transmitter may omit transmission of a packet (e.g., the capability packet of FIG. 12) for reporting whether it supports the out-band communication. That is, upon confirming that the wireless power receiver supports the out-band communication, the wireless power transmitter may request for the handover to out-band by transmitting a bit pattern (e.g., a bit pattern of FIG. 14) for handover to the wireless power receiver. According to an embodiment, a capability packet may also be transmitted in the PC1 to report whether the out-band communication is supported.

Next, a communication scheme that can be supported by the wireless power transmitter and receiver is described according to a phase.

The wireless power transmitter and receiver may mutually exchange a packet by using a specific communication method in any one a plurality of phases as shown in FIG. 5. In this case, the communication method may include at least one of in-band communication and out-band communication. That is, the wireless power transmitter and receiver may perform the in-band communication in a first phase, and may perform the out-band communication in a second phase. Herein, the first phase in which the wireless power transmitter and/or the wireless power receiver perform the in-band communication and the second phase in which the wireless power transmitter and/or the wireless power receiver perform the out-band communication may be defined variously. For example, the first phase is an initialization step of wireless charging, and may include a selection phase, a ping phase, an identification & configuration phase, and a negotiation phase. The second phase is a mid-late step of wireless charging, and may include a calibration phase and a power transfer phase.

The procedure for performing the handover to out-band may be defined without having to add a new phase to the existing phases, and an additional new phase may be prepared for the procedure for performing a handover to out-band. An embodiment of the former case may include a case where the procedure for performing a handover to out-band proceeds in the negotiation phase. An embodiment of the latter case may include a case where a handover phase is defined as a new phase.

Hereinafter, a method of performing a handover to out-band by a wireless power transmitter and receiver will be described by comprehensively considering a power class and a phase.

Embodiment in which Handover Procedure is Performed in Negotiation Phase

According to the present embodiment, a handover decision, initiation, and out-band communication initiation and link establishment are achieved by in-band communication in a negotiation phase.

Meanwhile, whether a handover to out-band is performed may be determined based on the number of several cases. As described above, in PC1, since out-band communication is mandatory, the wireless power receiver of PC1 supports the out-band communication by default. However, in PC0, the out-band communication is optional, and the wireless power transmitter or receiver may support or may not support the out-band communication. Therefore, the wireless power transmitter and receiver may have various numbers of cases according to a power class and according to whether the out-band communication is supported. A first case is a case where the wireless power receiver belongs to PC0 and does not support the out-band communication. A second case is a case where the wireless power receiver belongs to PC0, and supports the out-band communication. A third case is a case where the wireless power receiver belongs to PC1, and mandatorily supports the out-band communication.

A handover procedure may be determined depending on the number of several cases. Hereinafter, a procedure for performing a handover to out-band of the wireless power receiver is described by using a state diagram.

Figure 15:
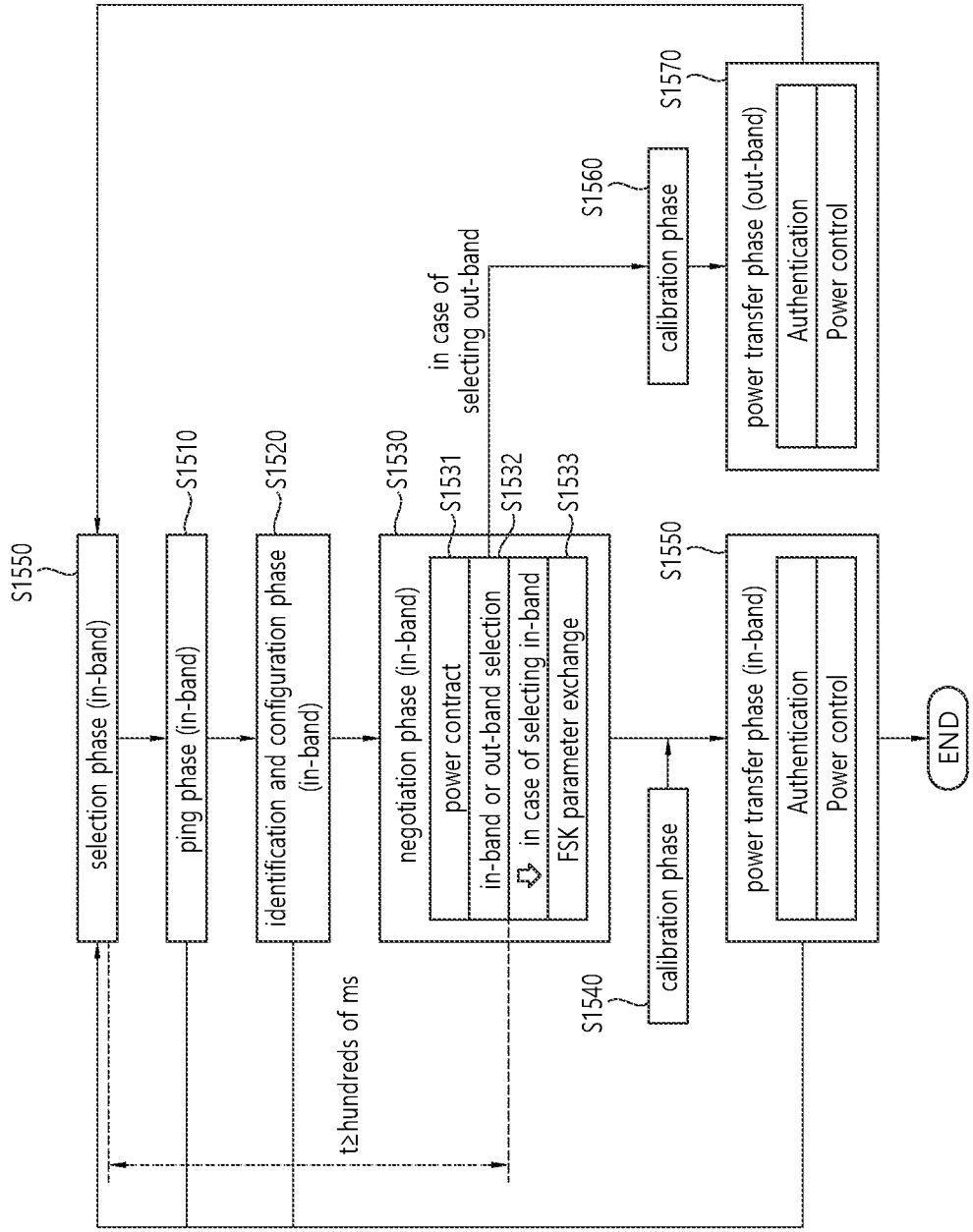
FIG. 15 is a state diagram illustrating a procedure of performing a handover to out-band according to an embodiment.

FIG. 15 is a state diagram illustrating a procedure of performing a handover to out-band according to an embodiment. A wireless power transmitter and wireless power receiver according to FIG. 15 may belong to PC0 or PC1.

Referring to FIG. 15, a first phase to which in-band communication is applied includes a selection phase (S1500), a ping phase (S1510), an identification and configuration phase (S1520), and a negotiation phase (S1530). In the negotiation phase (S1530), power contract (S1531) may be achieved.

In an aspect, if at least one of the wireless power transmitter and the wireless power receiver belongs to PC0, out-band communication may be optional. Therefore, the selection phase (S1532) of in-band communication and out-band communication may be performed in the negotiation phase (S1530), and the out-band communication may be selected in the selection phase (S1532). If the in-band communication is selected, the wireless power transmitter and receiver exchange parameters related to the in-band communication. For example, the in-band communication may include communication from the wireless power transmitter to the wireless power receiver. In this case, since communication is FSK, a parameter to be exchanged and related to in-band communication may include an FSK parameter (S1533). Thereafter, the wireless power transmitter and receiver enter a power transfer phase (S1550) through a calibration phase (S1540), and the in-band communication is used to transmit packets (e.g., packets related to authentication and power control) during the power transfer phase.

Meanwhile, upon detecting the out-band communication in the step S1532, a second state in which the out-band communication is applied includes a calibration phase (S1560) and a power transfer phase (S1570). The wireless power transmitter and receiver enter the power transfer phase (S1570) via the connection phase (S1560), and the out-band communication is used to transmit packets (e.g., packets related to authentication and power control) during the power transfer phase.

In another aspect, if both the wireless power transmitter and the wireless power receiver belong to PC1, out-band communication may be mandatory. Therefore, in case of PC1, the selection phase (S1532) may be omitted, and the handover to out-band may be achieved through in-band communication. Subsequently, the calibration phase (S1560) and the power transfer phase (S1570) may be performed identically.

When t is a time required from the selection phase (S1500) to the in-band or out-band selection phase (S1532), at least hundreds of milliseconds (ms) may be required for t.

The wireless power transmitter according to the embodiment of FIG. 15 corresponds to the wireless power transmitter, wireless power transmitting unit, or power transmitting portion of FIG. 1 to FIG. 11. Therefore, an operation of the wireless power transmitter in the present embodiment is implemented by combining one or two or more of components of the wireless power transmitter of FIG. 1 to FIG. 11. For example, the selection phase (S1532) of in-band communication and out-band communication may be performed in the negotiation phase (S1530), and an operation of selecting out-band communication or in-band communication, an operation of exchanging parameters related to in-band communication (S1533), an operation of transmitting or receiving packets (e.g., packets related to authentication and power control) during a power transfer phase by using out-band communication, an operation of detecting a swap, or the like may be performed by the communication/control unit 120.

In addition, the wireless power receiver according to the present embodiment corresponds to the wireless power receiver, wireless power receiving unit, or power receiving portion of FIG. 1 to FIG. 11. Therefore, an operation of the wireless power receiver in the present embodiment is implemented by combining one or two or more of components of the wireless power receiver of FIG. 1 to FIG. 11. For example, the selection phase (S1532) of in-band communication and out-band communication may be performed in the negotiation phase (S1530), and an operation of selecting out-band communication or in-band communication, an operation of exchanging parameters related to in-band communication (S1533), an operation of transmitting or receiving packets (e.g., packets related to authentication and power control) during a power transfer phase by using out-band communication, an operation of detecting a swap, or the like may be performed by the communication/control unit 220.

Figure 16:
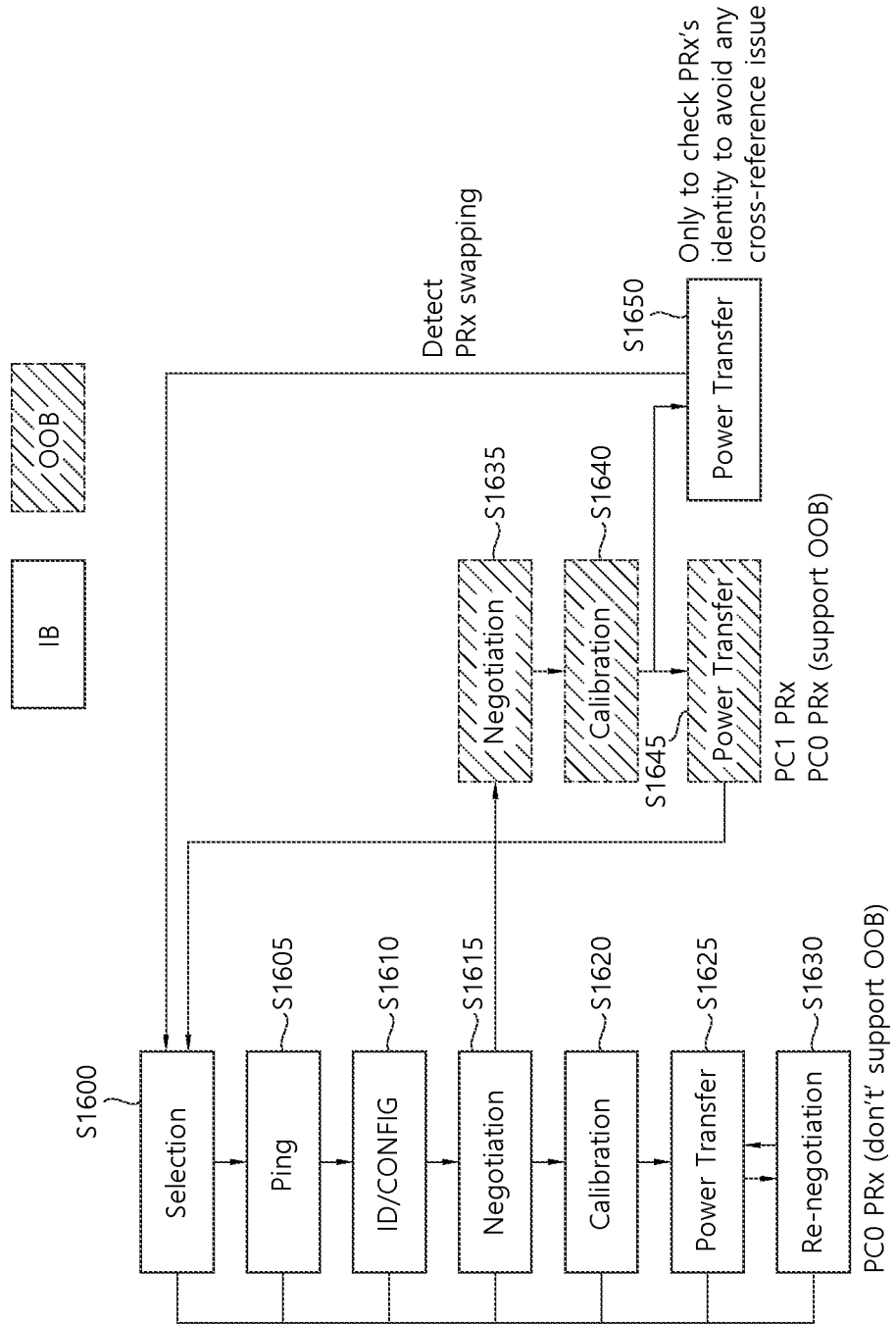
FIG. 16 is a state diagram illustrating a procedure in which a handover to out-band is performed according to another embodiment.

FIG. 16 is a state diagram illustrating a procedure in which a handover to out-band is performed according to another embodiment.

Referring to FIG. 16, in-band communication is used in a selection phase (S1600), a ping phase (S1605), and an identification and configuration phase (S1610). Thereafter, in a negotiation phase (S1615), according to whether a wireless power receiver supports out-band communication, the in-band communication may be continuously used or a handover to out-band is performed.

If the wireless power receiver belongs to PC0 and does not support out-band communication (PC0 PRx not supporting OOB), the in-band communication is used continuously in the negotiation phase (S1615), a calibration phase (S1620), a power transfer phase (S1625), and a re-negotiation phase (S1630).

If the wireless power receiver belongs to PC1 or supports out-band communication while belonging to PC0 (PC0 PRx supporting OOB), a handover is achieved from in-band to out-band, and the out-band communication is used continuously in a negotiation phase (S1635), a calibration phase (S1640), and a power transfer phase (S1645).

A wireless power transmitter may detect a sudden impedance change (a change in the amount of current flowing in a transmission coil) during wireless power transmission. The cause of the sudden impedance change may include a sudden location shift of the wireless power receiver or a swap of the wireless power receiver.

In this case, in order to detect the swap by identifying the wireless power transmitter, the wireless power transmitter and the wireless power receiver may perform swap detection intermittently or periodically by using in-band communication in the power transfer phase or by using in-band communication at the request of the wireless power transmitter (S1650).

If the swap is detected, the wireless power transmitter and the wireless power receiver return to the selection phase (S1600). Herein, the swap of the wireless power receiver is a phenomenon in which another device other than the wireless power receiver for which wireless charging is originally intended is connected for out-band to the wireless power transmitter. Due to the swap detection, the wireless power transmitter and receiver may perform out-band communication and in-band communication simultaneously during the power transfer phase.

The swap detection may include an operation in which the wireless power receiver transmits unique information to the wireless power transmitter, based on in-band communication. That is, the swap detection may be performed in such a manner that a currently serving wireless power receiver is identified to check whether it is a previously served wireless power receiver. For example, the unique information includes an ID packet. For another example, the unique information includes a random number. For another example, the unique information includes BLE device address information of the wireless power receiver used in the switching from in-band to out-band. For another example, the unique information may include at least one of the ID packet, the random number, and the BLE device address information.

Meanwhile, the swap detection may be performed periodically or intermittently by the wireless power receiver irrespective of the request of the wireless power transmitter, or may be performed at the request of the wireless power transmitter.

In an aspect, the swap detection at the request of the wireless power transmitter may include a step in which the wireless power transmitter uses out-band communication to request the wireless power receiver to provide unique information of the wireless power receiver. For example, the unique information of the wireless power receiver includes an ID packet. For another example, the unique information of the wireless power receiver includes a random number. For another example the unique information of the wireless power receiver includes BLE device address information of the wireless power receiver used in the switching from in-band to out-band. For another example, the unique information may include at least one of the ID packet, the random number, and the BLE device address information.

Herein, the step in which the wireless power transmitter requests for the unique information of the wireless power receiver may include a step in which the wireless power transmitter transmits its unique information. Herein, the unique information of the wireless power transmitter may be transmitted optionally. That is, the wireless power transmitter may transmit, or may not transmit, the unique information of the wireless power transmitter to the wireless power receiver. In this case, the wireless power receiver determines whether the unique information of the wireless power transmitter is received from the wireless power transmitter. If the wireless power transmitter does not transmit its unique information to the wireless power receiver, the wireless power receiver transmits default unique information to the wireless power transmitter. The default unit information may include, for example, the BLE device address information.

The wireless power transmitter may determine whether the swap occurs based on the unique information of the wireless power receiver. For example, if the wireless power receiver transmits the unique information of the wireless power receiver by using in-band communication and the wireless power transmitter receives the unique information of the wireless power receiver, the wireless power transmitter determines that the swap does not occur. Otherwise, if the wireless power receiver does not transmit the unique information of the wireless power receiver by using in-band communication within a specific given time or if the wireless power transmitter fails in reception of the unique information of the wireless power receiver despite the fact that the unique information of the wireless power receiver is transmitted, the wireless power transmitter may determine that the swap occurs.

In another aspect, the swap detection at the request of the wireless power transmitter may include a step in which the wireless power transmitter uses out-band communication to request the wireless power receiver to provide bit pattern information of the wireless power receiver and a step in which the wireless power receiver uses in-band communication (ASK) to transmit the bit pattern information to the wireless power transmitter in response to the request. The present embodiment may further include a step in which the wireless power receiver changes impedance at the request of the wireless power transmitter, and a step in which the wireless power transmitter detects the changed impedance to confirm that it is still in a magnetic coupling state with respect to the same wireless power receiver (or it is placed above the wireless power transmitter). If swapping occurs and thus the wireless power transmitter is in a magnetic coupling state with respect to another wireless power receiver (or if another wireless power receiver is placed above the wireless power transmitter), swapping can be detected since the wireless power receiver does not respond to the request of the wireless power transmitter. In this case, unique information of the wireless power transmitter or receiver is not particularly required. Since there may be problem in quality of in-band communication when high-power transmission is performed, in order to improve swap detection performance, a method of transferring simple bit pattern information as shown in the present embodiment may be more preferable than a packet type.

Due to the swap detection, the handover to out-band can guarantee that a link connection between the wireless power transmitter and receiver is paired for wireless charging without any cross-reference issue.

The wireless power transmitter according to the embodiment of FIG. 16 corresponds to the wireless power transmitter, wireless power transmitting unit, or power transmitting portion of FIG. 1 to FIG. 11. Therefore, an operation of the wireless power transmitter in the present embodiment is implemented by combining one or two or more of components of the wireless power transmitter of FIG. 1 to FIG. 11. For example, an operation of performing in-band communication for charging initialization and link establishment to OOB, an operation of requesting for entering the OOB handover phase by transmitting a bit pattern for handover to the wireless power receiver, an operation of performing swap detection, or the like in the present embodiment may be performed by the communication/control unit 120.

In addition, the wireless power receiver according to the embodiment of FIG. 16 corresponds to the wireless power receiver, wireless power receiving unit, or power receiving portion of FIG. 1 to FIG. 11. Therefore, an operation of the wireless power receiver in the present embodiment is implemented by combining one or two or more of components of the wireless power receiver of FIG. 1 to FIG. 11. For example, an operation of performing in-band communication for charging initialization and link establishment to OOB, an operation of receiving a bit pattern for handover, an operation of performing swap detection, or the like in the present embodiment may be performed by the communication/control unit 220.

Which communication protocol or communication method is applied to each phase on the entire phase diagram is described in FIG. 15 and FIG. 16, whereas which procedure is used to perform a handover to out-band in a negotiation phase will be described hereinafter.

Figure 17:
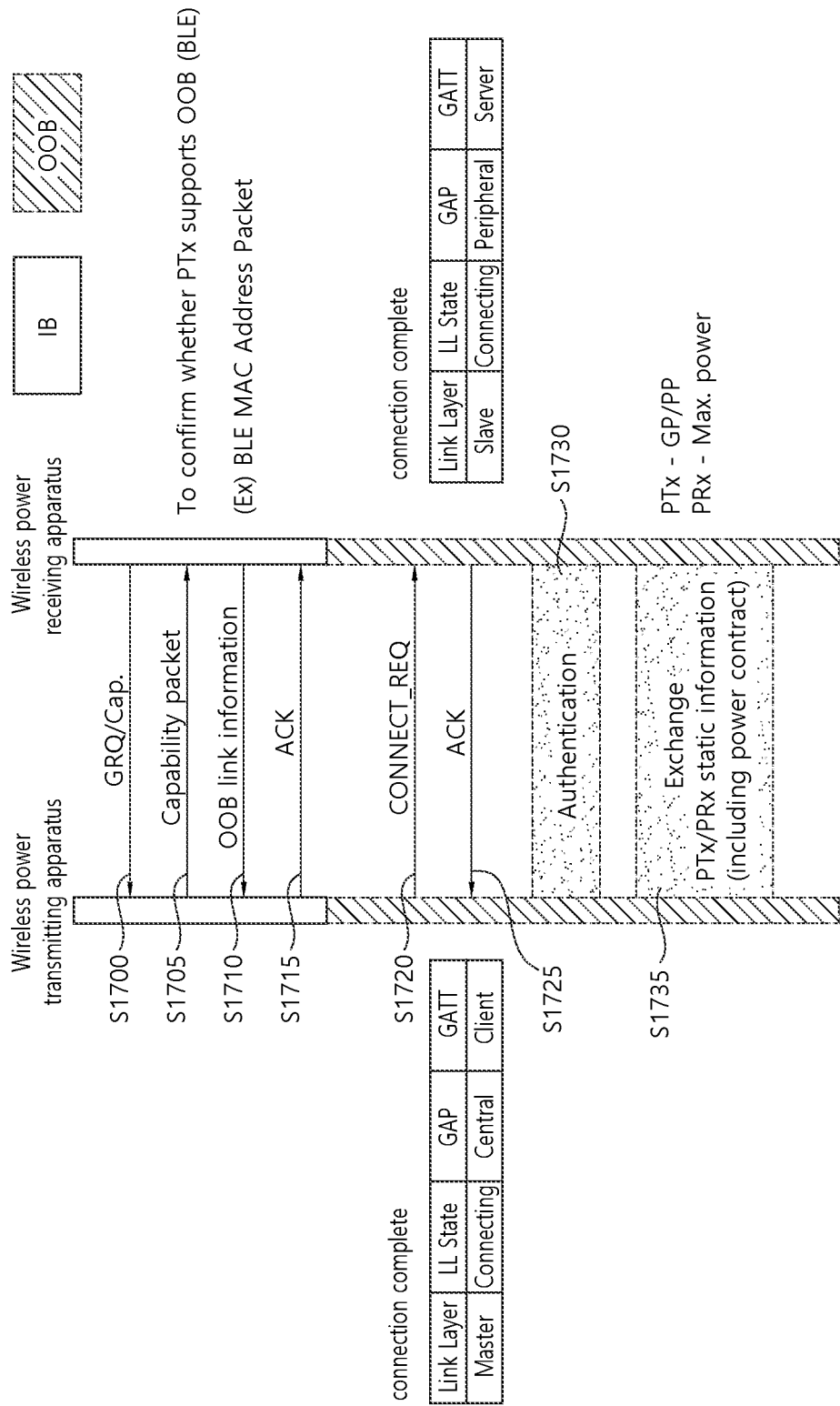
FIG. 17 is a flowchart illustrating a procedure of performing a handover to out-band in a negotiation phase according to an embodiment.

FIG. 17 is a flowchart illustrating a procedure of performing a handover to out-band in a negotiation phase according to an embodiment.

Referring to FIG. 17, the negotiation phase includes a communication duration and an out-band communication duration. The in-band communication duration includes steps S1700 to S1710, and the out-band communication duration includes steps S1720 to S1735.

First, in the in-band communication duration, a wireless power receiver transmits a general request packet (GRQ/Cap) to a wireless power transmitter to request for a capability packet (S1700). The wireless power transmitter transmits the capability packet in response to the general request packet (S1705). Herein, an example of the capability packet is shown in FIG. 12.

When an out-band flag included in the capability packet indicates that out-band communication is supported, the wireless power receiver transmits OOB link information to the wireless power transmitter (S1710). The OOB link information is transmitted through in-band communication, and for example, may have a packet structure of FIG. 18.

FIG. 18 shows OOB link information according to an embodiment.

The OOB link information may also be called a Bluetooth (or BLE) medium access control (MAC) packet of a wireless power receiver.

Referring to FIG. 18, in a negotiation phase, the wireless power receiver may transmit, to a wireless power transmitter, identification information (e.g., Bluetooth (or BLE) MAC address (6 bytes)) capable of uniquely identifying the wireless power receiver in out-band by using in-band communication. In this case, the Bluetooth (or BLE) MAC address may be transmitted to a power transmitting unit through a newly defined packet or the existing packet transmitted/received in the negotiation phase. However, the OOB link information is not limited thereto, and may be defined as various packet formats indicating the Bluetooth (or BLE) MAC address of the wireless transmission receiver.

In addition, WPID may be used as identification information capable of uniquely identifying the wireless power receiver. In this case, the WPID may be a BLE device address of the wireless power receiver.

Referring back to FIG. 17, upon successfully receiving a corresponding packet without error, in response thereto, the wireless power transmitter may transmit an acknowledgement (ACK) to the wireless power receiver (S1715).

If the OOB link information is successfully transmitted, the in-band communication duration in the negotiation phase ends to enter the out-band communication duration. In an out-band communication duration, the wireless power transmitter and receiver may mutually transmit/receive packets and signals by using the out-band communication protocol/scheme and the MAC address related to out-band, thereby establishing an out-band connection (or link).

To this end, the wireless power transmitter transmits to the wireless power receiver a CONNECT_REQ message for requesting for establishing the out-band connection with the wireless power receiver. The MAC address of the wireless power transmitter and parameters required to establish the out-band connection between the wireless power transmitter and receiver may be included in the CONNECT_REQ message.

If the wireless power receiver grants an out-band connection request of the wireless power transmitter, the wireless power receiver transmits an ACK message to the wireless power transmitter in response to the CONNECT_REQ message (S1725). Accordingly, out-band connection establishment may be complete. A service in an out-band profile (e.g., a Bluetooth profile) established in this case may be set to 'WPC_service_UUID'. The wireless power transmitter may operate by being set to a master (link layer), a central (generic access profile (GAP)), and a client (generic attribute profile (GATT)). The wireless power receiver may operate by being set to a slave (link layer), a peripheral (GAP), and a server (GATT).

Next, an authentication procedure may be performed between the wireless power transmitter and receiver (S1730). After the authentication procedure is successfully complete, the wireless power transmitter and receiver transmit/receive mutual static information and dynamic information by using out-band communication, and a power contract may be achieved by using the out-band communication. For example, the wireless power transmitter may transmit a guaranteed power (GP) and a potential power (PP) to the wireless power receiver, and the wireless power receiver may transmit max power to the wireless power transmitter.

The wireless power transmitter according to the embodiment of FIG. 17 corresponds to the wireless power transmitter, wireless power transmitting unit, or power transmitting portion of FIG. 1 to FIG. 11. Therefore, an operation of the wireless power transmitter in the present embodiment is implemented by combining one or two or more of components of the wireless power transmitter of FIG. 1 to FIG. 11. For example, operations of the wireless power receiver of the steps S1700 to S1735 in the present embodiment may be performed by the communication/control unit 120.

In addition, the wireless power receiver according to the embodiment of FIG. 16 corresponds to the wireless power receiver, wireless power receiving unit, or power receiving portion of FIG. 1 to FIG. 11. Therefore, an operation of the wireless power receiver in the present embodiment is implemented by combining one or two or more of components of the wireless power receiver of FIG. 1 to FIG. 11. For example, operations of the wireless power receiver of the steps S1700 to S1735 in the present embodiment may be performed by the communication/control unit 220.

Embodiment in which Handover Procedure is Performed in Handover Phase

Figure 19:
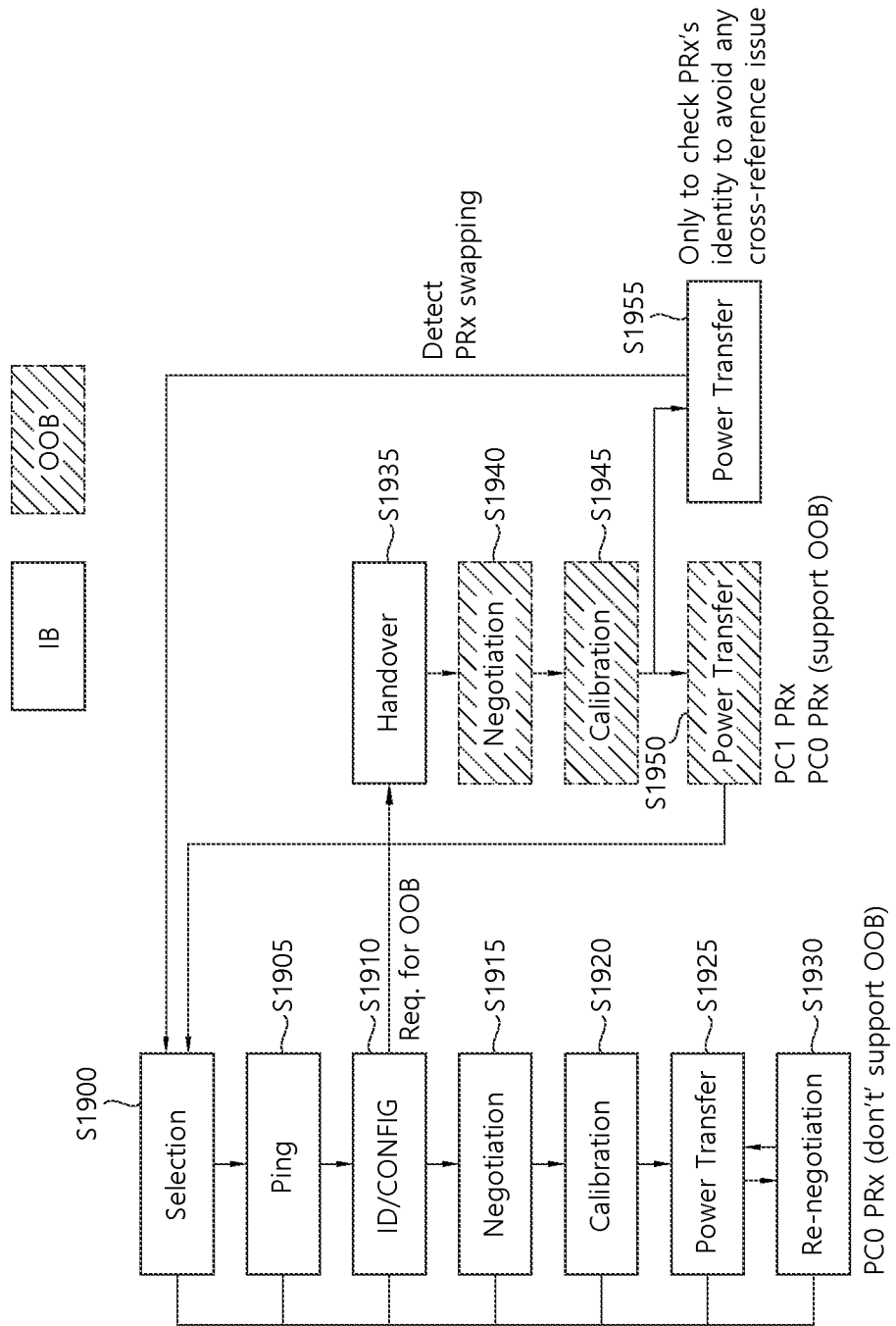
FIG. 19 is a state diagram illustrating a procedure of performing a handover to out-band according to another embodiment.

FIG. 19 is a state diagram illustrating a procedure of performing a handover to out-band according to another embodiment. A difference between the embodiment of FIG. 19 and the embodiment of FIG. 16 lies in a phase in which the handover to out-band is performed. That is, the handover is performed in a negotiation phase in the handover procedure of FIG. 16, whereas the handover to out-band is performed not in the negotiation phase but in a separate handover phase in the handover procedure of FIG. 19. The handover phase is a new phase defined after an identification and configuration phase.

Specifically, referring to FIG. 19, in-band communication is used in a selection phase (S1900), a ping phase (S1905), and an identification and configuration phase (S1910). After the identification and configuration phase (S1910), according to whether a wireless power receiver supports out-band communication, in-band communication may be continuously used or a handover to out-band is performed.

If the wireless power receiver belongs to PC0 and does not support out-band communication (PC0 PRx not supporting OOB), in-band communication is used continuously in a negotiation phase (S1915), a calibration phase (S1920), a power transfer phase (S1925), and a re-negotiation phase (S1930).

If the wireless power receiver belongs to PC1 or supports out-band communication while belonging to PC0 (PC0 PRx supporting OOB), the wireless power transmitter and receiver enter a handover phase (S1935) according to a handover request to out-band of the wireless power transmitter. In the handover phase (S1935), a handover is achieved from in-band to out-band, and the out-band communication is used continuously in a negotiation phase (S1940), a calibration phase (S1945), and a power transfer phase (S1950). In this case, in order to detect the swap by identifying the wireless power transmitter, the wireless power transmitter and the wireless power receiver may perform swap detection intermittently or periodically in the power transfer phase or by using in-band communication at the request of the wireless power transmitter (S1955). For swap detection, the wireless power receiver may transmit unique information to the wireless power transmitter by using in-band communication. In addition, transmission of the unique information or swap detection may be triggered at the request of the wireless power transmitter.

In an aspect, the swap detection at the request of the wireless power transmitter may include a step in which the wireless power transmitter uses out-band communication to request the wireless power receiver to provide unique information of the wireless power receiver. For example, the unique information of the wireless power receiver includes an ID packet. For another example, the unique information of the wireless power receiver includes a random number. For another example the unique information of the wireless power receiver includes BLE device address information of the wireless power receiver used in the switching from in-band to out-band. For another example, the unique information may include at least one of the ID packet, the random number, and the BLE device address information.

Herein, the step in which the wireless power transmitter requests for the unique information of the wireless power receiver may include a step in which the wireless power transmitter transmits its unique information. Herein, the unique information of the wireless power transmitter may be transmitted optionally. That is, the wireless power transmitter may transmit, or may not transmit, the unique information of the wireless power transmitter to the wireless power receiver. In this case, the wireless power receiver determines whether the unique information of the wireless power transmitter is received from the wireless power transmitter. If the wireless power transmitter does not transmit its unique information to the wireless power receiver, the wireless power receiver transmits default unique information to the wireless power transmitter. The default unit information may include, for example, the BLE device address information.

The wireless power transmitter may determine whether the swap occurs based on the unique information of the wireless power receiver. For example, if the wireless power receiver transmits the unique information of the wireless power receiver by using in-band communication and the wireless power transmitter receives the unique information of the wireless power receiver, the wireless power transmitter determines that the swap does not occur. Otherwise, if the wireless power receiver does not transmit the unique information of the wireless power receiver by using in-band communication within a specific given time or if the wireless power transmitter fails in reception of the unique information of the wireless power receiver despite the fact that the unique information of the wireless power receiver is transmitted, the wireless power transmitter may determine that the swap occurs.

In another aspect, the swap detection at the request of the wireless power transmitter may include a step in which the wireless power transmitter uses out-band communication to request the wireless power receiver to provide bit pattern information of the wireless power receiver and a step in which the wireless power receiver uses in-band communication (ASK) to transmit the bit pattern information to the wireless power transmitter in response to the request. The present embodiment may further include a step in which the wireless power receiver changes impedance at the request of the wireless power transmitter, and a step in which the wireless power transmitter detects the changed impedance to confirm that it is still in a magnetic coupling state with respect to the same wireless power receiver (or it is placed above the wireless power transmitter). If swapping occurs and thus the wireless power transmitter is in a magnetic coupling state with respect to another wireless power receiver (or if another wireless power receiver is placed above the wireless power transmitter), swapping can be detected since the wireless power receiver does not respond to the request of the wireless power transmitter. In this case, unique information of the wireless power transmitter or receiver is not particularly required. Since there may be problem in quality of in-band communication when high-power transmission is performed, in order to improve swap detection performance, a method of transferring simple bit pattern information as shown in the present embodiment may be more preferable than a packet type.

If the swap is detected, the wireless power transmitter and the wireless power receiver return to the selection phase (S1900).

An operation of a wireless power receiver supporting out-band communication in the identification and configuration phase (S1910) is described in detail with reference to FIG. 20, and an operation of a wireless power transmitter is described in detail with reference to FIG. 21.

Figure 20:
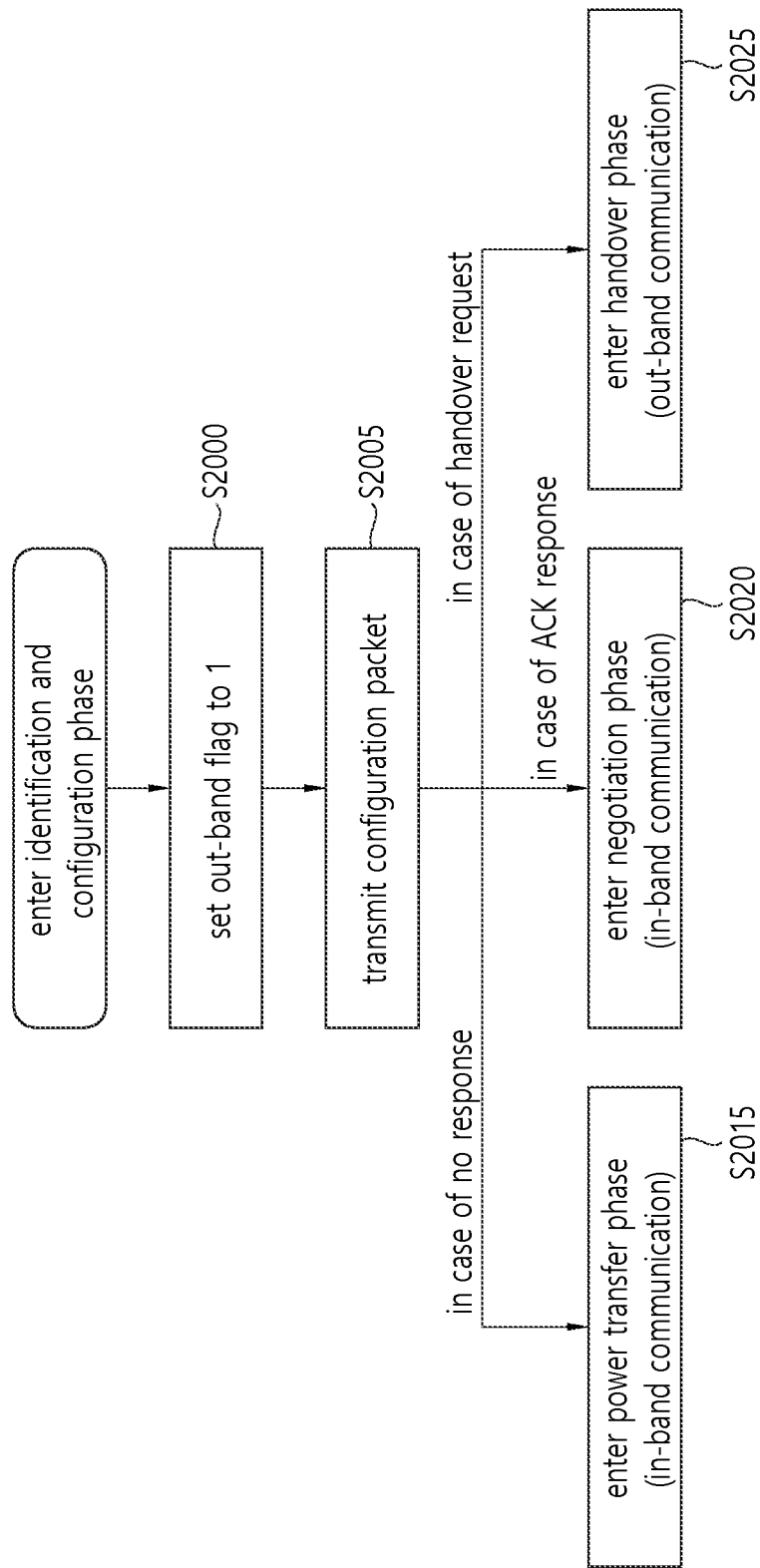
FIG. 20 is an operational flowchart of a wireless power receiver supporting out-band communication in an identification and configuration phase according to FIG. 19.

FIG. 20 is an operational flowchart of a wireless power receiver supporting out-band communication in an identification and configuration phase according to FIG. 19.

Referring to FIG. 20, the wireless power receiver may indicate an out-band flag to a specific value (e.g., '1') to indicate that out-band communication is supported (S2000). In the identification and configuration phase (S1910), the wireless power receiver transmits a configuration packet including the out-band flat to the wireless power transmitter (S2005), and monitors a response of the wireless power transmitter.

If the response of the wireless power transmitter is no response, this indicates that the wireless power transmitter does not support the negotiation phase and the out-band communication. Therefore, the wireless power receiver enters a power transfer phase (S2015). In-band communication is used in the power transfer phase after phase (S2015).

If the response of the wireless power transmitter is an ACK response, this indicates that the wireless power transmitter supports the negotiation phase but does not support out-band communication. Therefore, the wireless power receiver enters the negotiation phase of S1915 (S2020). Since the wireless power transmitter does not support out-band communication, in-band communication is used in phases after the step S2020.

If the response of the wireless power transmitters is another response (e.g., a handover request to out-band or switching to out-band) which is neither no-response nor ACK response, this indicates that the wireless power transmitter supports out-band communication. Therefore, the wireless power receiver enters the handover phase of S1935 (S2025). Since both the wireless power transmitter and receiver support out-band communication, the out-band communication is used in phases after the step S2025. However, for swap detection, in-band communication may be used in parallel with out-the band communication.

In addition, the wireless power receiver according to the embodiment of FIG. 20 corresponds to the wireless power receiver, wireless power receiving unit, or wireless receiving portion of FIG. 1 to FIG. 11. Therefore, an operation of the wireless power receiver for each step in the present embodiment is implemented by combining one or two or more of components of the wireless power receiver of FIG. 1 to FIG. 11. For example, operations based on the steps S2000 to S2025 may be performed by the communication/control unit 220.

Figure 21:
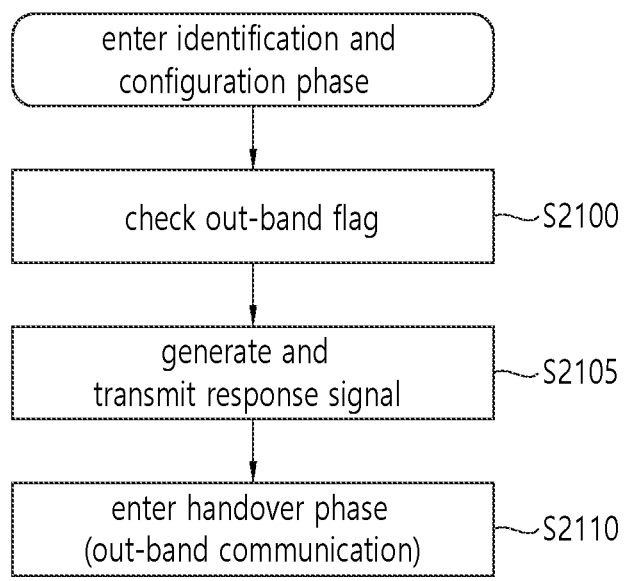
FIG. 21 is an operational flowchart of a wireless power transmitter supporting out-band communication in an identification and configuration phase according to FIG. 19.

FIG. 21 is an operational flowchart of a wireless power transmitter supporting out-band communication in an identification and configuration phase according to FIG. 19.

Referring to FIG. 21, the wireless power transmitter may check an out-band flag included in a configuration packet (S2100), and thus may recognize whether a wireless power receiver paired for wireless charging supports out-band communication. If the out-band flag is set to '1', this may indicate that the wireless power receiver supports the out-band communication, and if the out-band flag is set to '0', this may indicate that the wireless power receiver does not support the out-band communication. If the identification result of the out-band flag shows that the out-band flag is set to '1', the wireless power transmitter generates and transmits a response signal thereof (S2105). The response signal may have a specific bit pattern.

If the wireless power transmitter supports the out-band communication, the wireless power transmitter transmits a request signal for requesting a handover to out-band as a response signal to the wireless power receiver. Herein, the signal for requesting the handover for out-band may also be called another term such as a request signal for entering a handover phase, a signal for switching to out-band, a request signal for out-band, or the like. A signal for requesting the handover to out-band may be a specific bit pattern. The bit pattern may reuse the existing NAK or ND, and may be a value newly defined as a response to a configuration packet of the wireless power receiver. The bit pattern may consist of 8 bits.

The wireless power transmitter enters the handover phase (S2110). Since both the wireless power transmitter and receiver support the out-band communication, the out-band communication is used in phases after the step S2110. However, for swap detection, in-band communication may be used in parallel with the out-band communication.

The wireless power transmitter according to the embodiment of FIG. 21 corresponds to the wireless power transmitter, wireless power transmitting unit, or power transmitting portion of FIG. 1 to FIG. 11. Therefore, an operation of the wireless power transmitter in the present embodiment is implemented by combining one or two or more of components of the wireless power transmitter of FIG. 1 to FIG. 11. For example, operations of the wireless power transmitter in the steps S2100 to S2105 may be performed by the communication/control unit 120.

Figure 22:
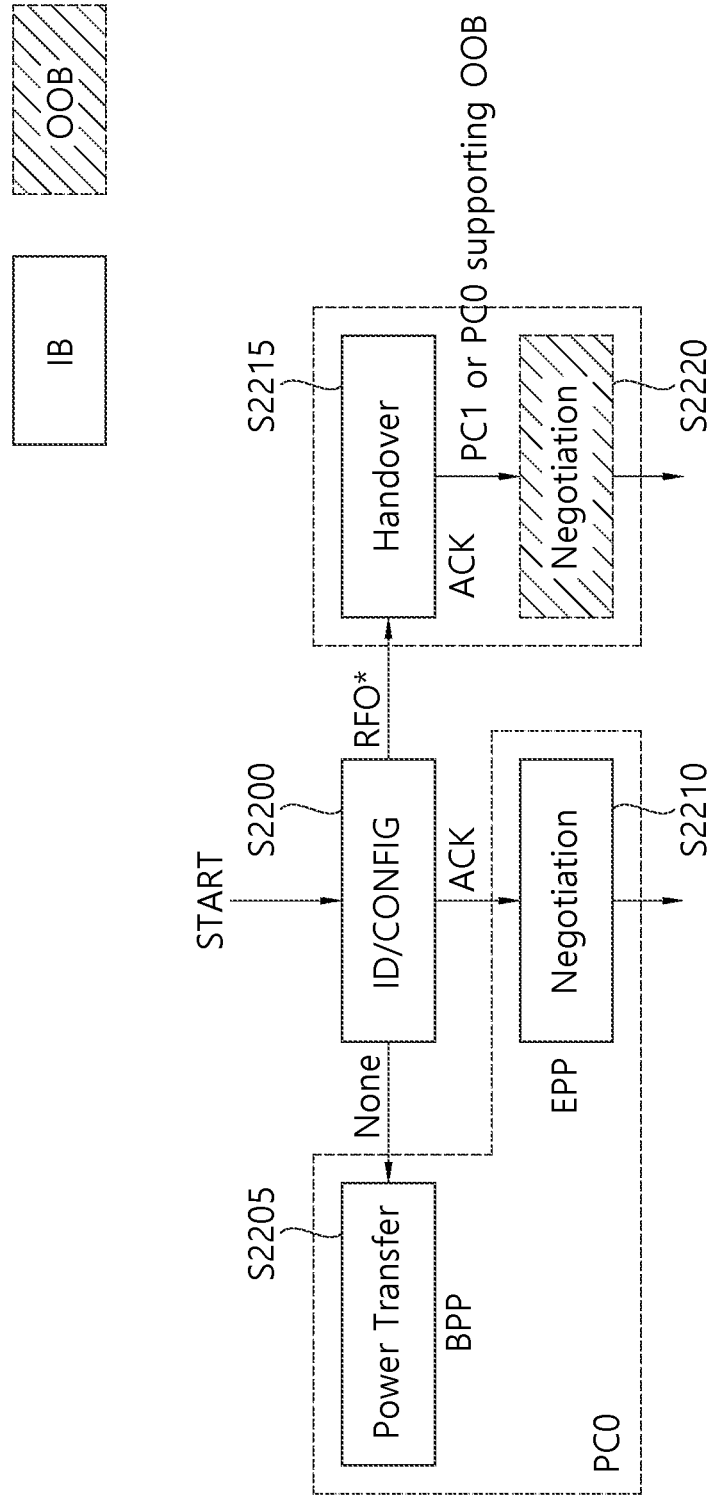
FIG. 22 is a diagram in which subsequent phases based on a response signal of a wireless power transmitter are classified in terms of a power class in an identification and configuration phase of FIG. 19.

FIG. 22 is a diagram in which subsequent phases based on a response signal of a wireless power transmitter are classified in terms of a power class in an identification and configuration phase of FIG. 19.

Referring to FIG. 22, a BPP wireless power transmitter of PC0 does not support a negotiation phase and out-band communication. Therefore, the BPP wireless power transmitter of PC0 does not response (None) to a configuration packet of a wireless power receiver in an identification and configuration phase (S2200), and the wireless power transmitter and receiver enter a power transfer phase (S2205).

Meanwhile, an EPP wireless power transmitter of PC0 may support a negotiation phase, and may optionally support out-band communication.

If the EPP wireless power transmitter of PC0 does not support the out-band communication, the EPP wireless power transmitter of PC0 transmits ACK in response to the configuration packet of the wireless power receiver in the identification and& configuration phase (S2200), and enters the negotiation phase (S2210).

If the wireless power transmitter belongs to PC1, or supports the out-band communication in case of not belonging to EPP of PC0, the wireless power transmitter responds to a request for OOB link (RFO) for a configuration packet of the wireless power receiver in the identification and configuration phase (S2200), and enters the handover phase (S2215). The RFO may be, for example, ND, NAK, or a new FSK response pattern of another forma. In the handover phase, when the wireless power receiver responds with ACK as a grant in response to the RFO, the wireless power transmitter and receiver enter the negotiation phase (S2220).

The wireless power transmitter according to the embodiment of FIG. 22 corresponds to the wireless power transmitter, wireless power transmitting unit, or power transmitting portion of FIG. 1 to FIG. 11. Therefore, an operation of the wireless power transmitter in the present embodiment is implemented by combining one or two or more of components of the wireless power transmitter of FIG. 1 to FIG. 11. For example, operations of the wireless power transmitter in the steps S2200 to S2220 may be performed by the communication/control unit 120.

In addition, the wireless power receiver according to the embodiment of FIG. 22 corresponds to the wireless power receiver, wireless power receiving unit, or wireless receiving portion of FIG. 1 to FIG. 11. Therefore, an operation of the wireless power receiver for each step in the present embodiment is implemented by combining one or two or more of components of the wireless power receiver of FIG. 1 to FIG. 11. For example, operations of the wireless power receiver in steps the S2200 to S2220 may be performed by the communication/control unit 220.

Which communication protocol or communication method is applied to each phase on the entire phase diagram is described in FIG. 19 and FIG. 22, whereas which procedure is used to perform a handover to out-band in a handover phase and a negotiation phase will be described hereinafter.

Figure 23:
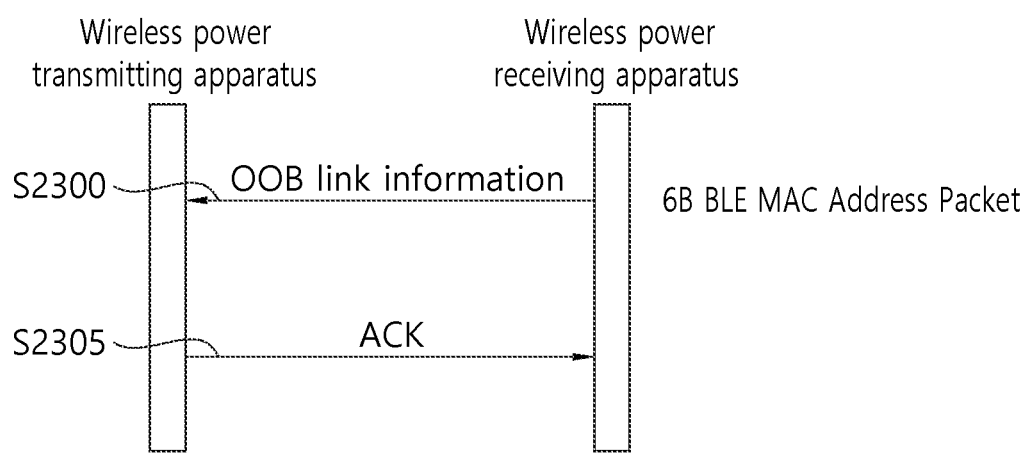
FIG. 23 is a flowchart illustrating a procedure of performing a handover to out-band in a handover phase according to an embodiment.
Figure 24:
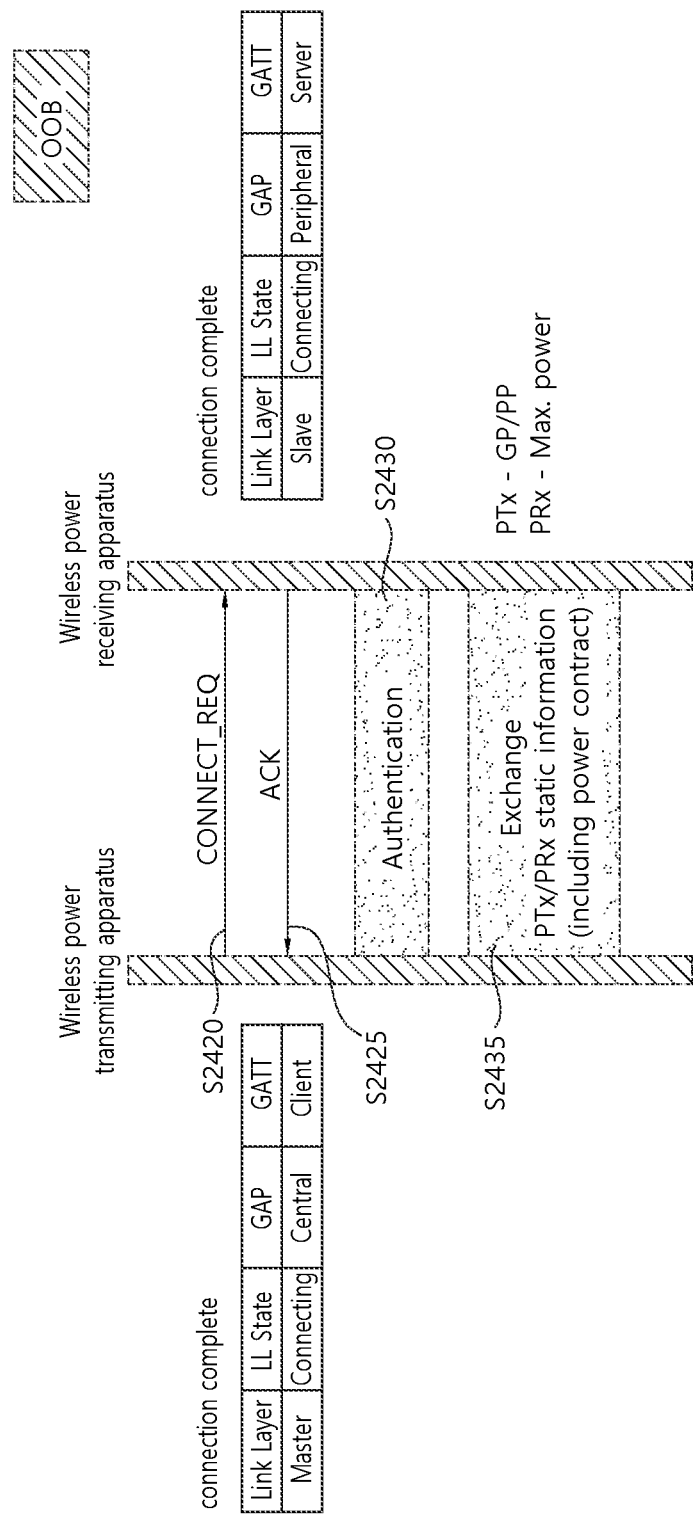
FIG. 24 is a flowchart of performing a handover to out-band in a negotiation phase according to another embodiment.

FIG. 23 is a flowchart illustrating a procedure of performing a handover to out-band in a handover phase according to an embodiment, and FIG. 24 is a flowchart of performing a handover to out-band in a negotiation phase according to another embodiment.

Comparing the embodiment based on FIG. 23 and FIG. 24 with the embodiment of FIG. 17, if the handover phase and the negotiation phase are combined based on FIG. 23, it becomes identical to the negotiation phase based on FIG. 17. Specifically, the handover phase of FIG. 23 corresponds to the in-band communication duration of FIG. 17, and the negotiation phase of FIG. 24 corresponds to the out-band communication duration of FIG. 17.

Therefore, an operation of the wireless power transmitter and receiver in the handover phase of FIG. 23 is identical to the operation of the wireless power transmitter and receiver in the in-band communication duration of FIG. 17, and an operation of the wireless power transmitter and receiver in the negotiation phase of FIG. 24 is identical to the operation of the wireless power transmitter and receiver in the out-band communication duration of FIG. 17.

The wireless power transmitter according to the embodiment of FIG. 23 and FIG. 24 corresponds to the wireless power transmitter, wireless power transmitting unit, or power transmitting portion of FIG. 1 to FIG. 11. Therefore, an operation of the wireless power transmitter in the present embodiment is implemented by combining one or two or more of components of the wireless power transmitter of FIG. 1 to FIG. 11. For example, operations of the wireless power transmitter in the steps S2200, S2305, and S2400 to S2420 may be performed by the communication/control unit 120.

In addition, the wireless power receiver according to the embodiment of FIG. 23 and FIG. 24 corresponds to the wireless power receiver, wireless power receiving unit, or wireless receiving portion of FIG. 1 to FIG. 11. Therefore, an operation of the wireless power receiver for each step in the present embodiment is implemented by combining one or two or more of components of the wireless power receiver of FIG. 1 to FIG. 11. For example, operations of the wireless power receiver in the steps S2300, S2305, and S2400 to S2420 may be performed by the communication/control unit 220.

Embodiment of Operation after OOB Connection Establishment is Complete

Hereinafter, a detailed operation for each phase is disclosed, which is performed after an OOB connection establishment is complete (e.g., after a handover to out-band is complete) across a handover phase and a negotiation phase.

Figure 25:
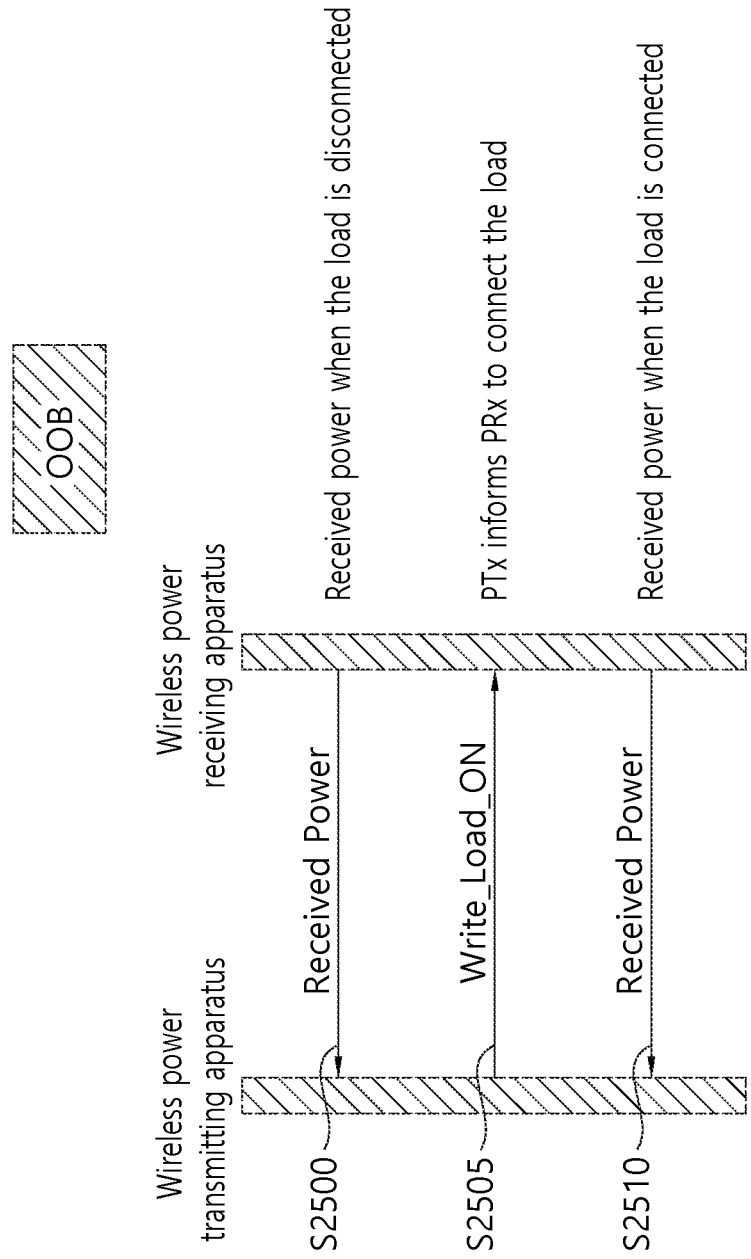
FIG. 25 is an operational flowchart of a wireless power transmitter and receiver in a calibration phase according to an embodiment.

FIG. 25 is an operational flowchart of a wireless power transmitter and receiver in a calibration phase according to an embodiment. The calibration phase of FIG. 25 may be identical to the calibration phase of steps S1540 and S1560 of FIG. 15, the calibration phase of steps S1620 and S2640 of FIG. 16, and the calibration phase of steps S1920 and S1945 of FIG. 19.

Referring to FIG. 25, the wireless power receiver transmits to the wireless power transmitter a received power packet (RPP) in a state where a load is connected to the wireless power receiver (S2500).

Next, the wireless power transmitter transmits to the wireless power receiver a Write_Load_ON message to inform the wireless power receiver to connect the load (S2505).

If the load is connected to the wireless power receiver in response to the Write_Load_ON message, the wireless power receiver transmits to the wireless power transmitter the RPP in the state where the load is connected (S2510).

Figure 26:
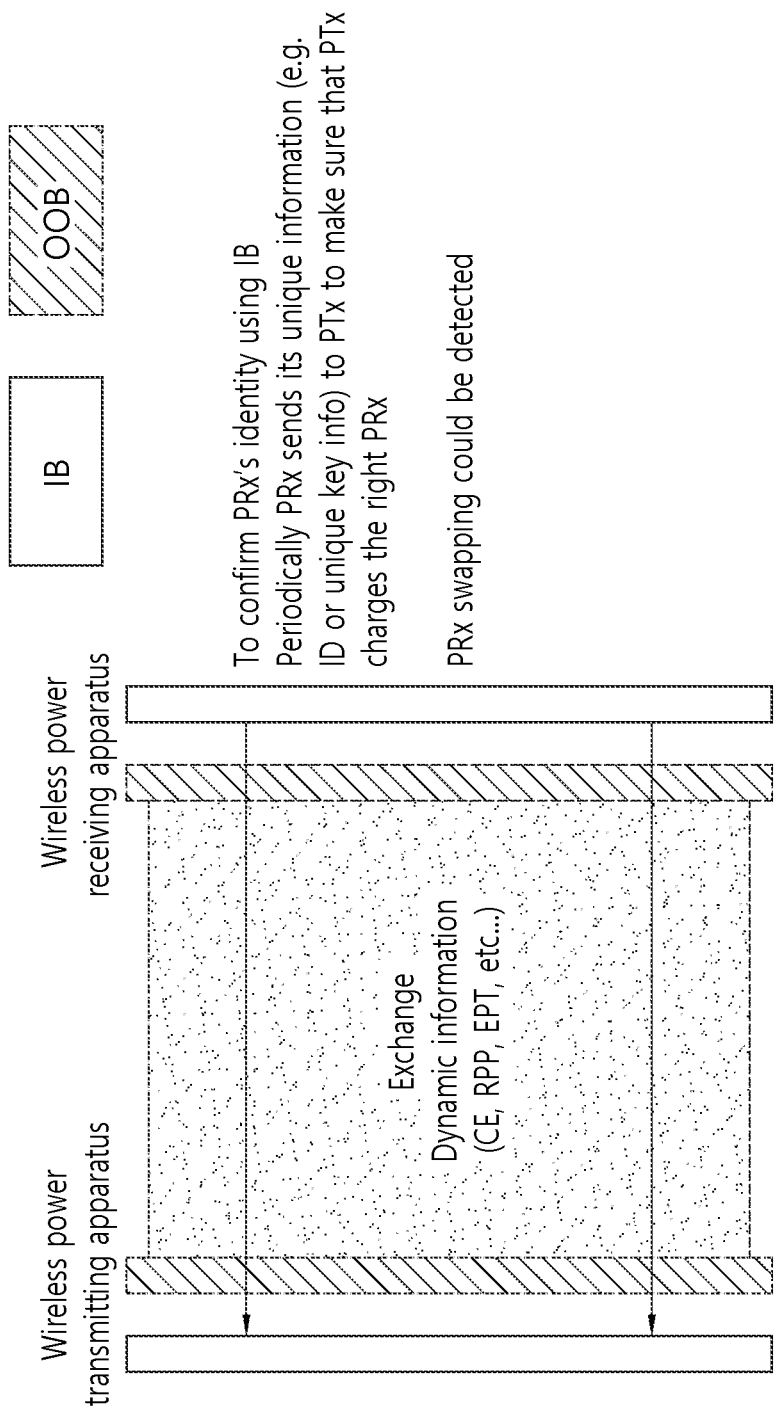
FIG. 26 is an operational flowchart of a wireless power transmitter and receiver in a power transfer phase according to an embodiment.

FIG. 26 is an operational flowchart of a wireless power transmitter and receiver in a power transfer phase according to an embodiment. The power transfer phase of FIG. 26 may be identical to the power transfer phase of steps S1550 and S1570 of FIG. 15, the power transfer phase of steps S1625 and S1645 of FIG. 16, and the power transfer phase of steps S1925 and S1950 of FIG. 19.

Referring to FIG. 26, the wireless power transmission and receiver transmit/receive mutual static information and dynamic information by using out-band communication. For example, a control error (CE) packet, a received power packet (RPP), an end power transfer (EPT) packet, or the like is exchanged through the out-band communication.

In this case, in order to detect a swap by identifying the wireless power transmitter, the wireless power transmitter and the wireless power receiver may perform swap detection by using in-band communication intermittently or periodically in the power transfer phase or at the request of the wireless power transmitter. The swap detection may include an operation in which the wireless power receiver transmits unique information (e.g., an ID packet or unique kay info) to the wireless power transmitter, based on in-band communication. That is, the swap detection may be performed in such a manner that a currently serving wireless power receiver is identified to check whether it is a previously served wireless power receiver. Transmission of unique information or swap detection may be triggered at the request of the wireless power transmitter.

In an aspect, the swap detection at the request of the wireless power transmitter may include a step in which the wireless power transmitter uses out-band communication to request the wireless power receiver to provide unique information of the wireless power receiver. For example, the unique information of the wireless power receiver includes an ID packet. For another example, the unique information of the wireless power receiver includes a random number. For another example the unique information of the wireless power receiver includes BLE device address information of the wireless power receiver used in the switching from in-band to out-band. For another example, the unique information may include at least one of the ID packet, the random number, and the BLE device address information.

Herein, the step in which the wireless power transmitter requests for the unique information of the wireless power receiver may include a step in which the wireless power transmitter transmits its unique information. Herein, the unique information of the wireless power transmitter may be transmitted optionally. That is, the wireless power transmitter may transmit, or may not transmit, the unique information of the wireless power transmitter to the wireless power receiver. In this case, the wireless power receiver determines whether the unique information of the wireless power transmitter is received from the wireless power transmitter. If the wireless power transmitter does not transmit its unique information to the wireless power receiver, the wireless power receiver transmits default unique information to the wireless power transmitter. The default unit information may include, for example, the BLE device address information.

The wireless power transmitter may determine whether the swap occurs based on the unique information of the wireless power receiver. For example, if the wireless power receiver transmits the unique information of the wireless power receiver by using in-band communication and the wireless power transmitter receives the unique information of the wireless power receiver, the wireless power transmitter determines that the swap does not occur. Otherwise, if the wireless power receiver does not transmit the unique information of the wireless power receiver by using in-band communication within a specific given time or if the wireless power transmitter fails in reception of the unique information of the wireless power receiver despite the fact that the unique information of the wireless power receiver is transmitted, the wireless power transmitter may determine that the swap occurs.

In another aspect, the swap detection at the request of the wireless power transmitter may include a step in which the wireless power transmitter uses out-band communication to request the wireless power receiver to provide bit pattern information of the wireless power receiver and a step in which the wireless power receiver uses in-band communication (ASK) to transmit the bit pattern information to the wireless power transmitter in response to the request. The present embodiment may further include a step in which the wireless power receiver changes impedance at the request of the wireless power transmitter, and a step in which the wireless power transmitter detects the changed impedance to confirm that it is still in a magnetic coupling state with respect to the same wireless power receiver (or it is placed above the wireless power transmitter). If swapping occurs and thus the wireless power transmitter is in a magnetic coupling state with respect to another wireless power receiver (or if another wireless power receiver is placed above the wireless power transmitter), swapping can be detected since the wireless power receiver does not respond to the request of the wireless power transmitter. In this case, unique information of the wireless power transmitter or receiver is not particularly required. Since there may be problem in quality of in-band communication when high-power transmission is performed, in order to improve swap detection performance, a method of transferring simple bit pattern information as shown in the present embodiment may be more preferable than a packet type.

If the swap is detected, the wireless power transmitter and the wireless power receiver may return to the selection phase.

The wireless power transmitter according to the embodiment of FIG. 25 and FIG. 26 corresponds to the wireless power transmitter, wireless power transmitting unit, or power transmitting portion of FIG. 1 to FIG. 11. Therefore, an operation of the wireless power transmitter in the present embodiment is implemented by combining one or two or more of components of the wireless power transmitter of FIG. 1 to FIG. 11.

In addition, the wireless power receiver according to the embodiment of FIG. 25 and FIG. 26 corresponds to the wireless power receiver, wireless power receiving unit, or wireless receiving portion of FIG. 1 to FIG. 11. Therefore, an operation of the wireless power receiver for each step in the present embodiment is implemented by combining one or two or more of components of the wireless power receiver of FIG. 1 to FIG. 11.

According to embodiments of the present specification, initial phases are performed by in-band communication, and preliminary information related to out-band communication is exchanged by in-band communication in the negotiation phase or the handover phase. When conforming to this method, a time required until the handover to out-band is complete is confirmed through experiments. In this experiment, Bluetooth communication (BLE) is used as out-band communication. A time duration from the selection phase until a handover to Bluetooth is complete (or until a Bluetooth connection establishment is complete) may be divided into: i) an in-band communication duration; and ii) a Bluetooth connection establishment duration.

First, a required time of the in-band communication duration is calculated as follows with reference to FIG. 27.

Figure 27:
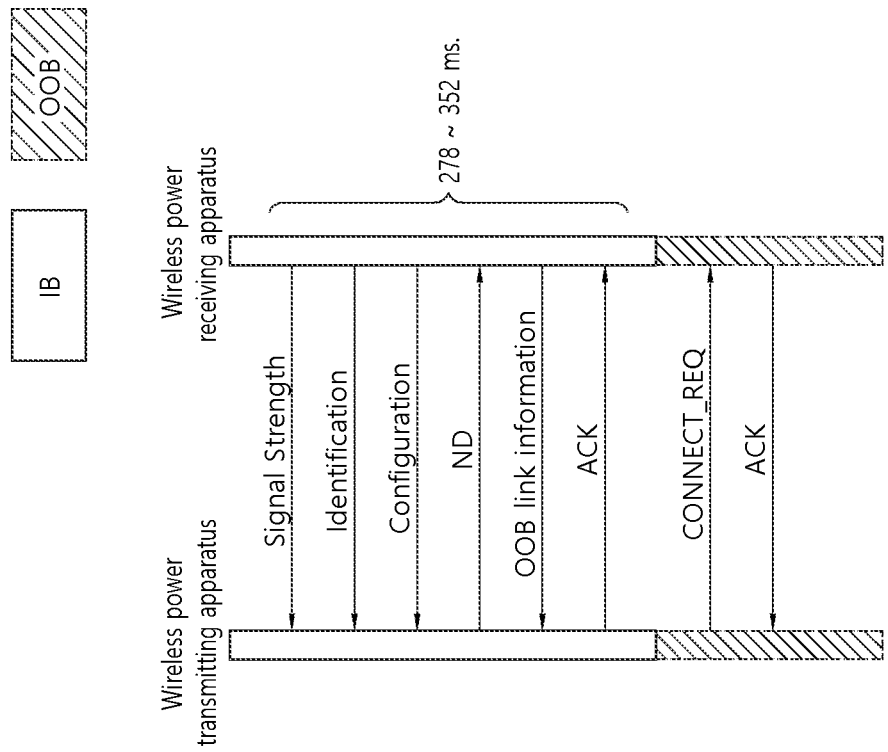
FIG. 27 is a flowchart illustrating a procedure of performing a handover to Bluetooth and a simulation of a required time according to an embodiment.

FIG. 27 is a flowchart illustrating a procedure of performing a handover to Bluetooth and a simulation of a required time according to an embodiment.

Referring to FIG. 27, an in-band communication duration includes signal strength packet transmission (ASK communication), identification packet transmission (ASK communication), configuration packet transmission (ASK communication), ND transmission (FSK communication), OOB link information transmission (ASK communication), and ACK transmission (FSK communication). An experiment result confirms that it takes about 278 ms to 352 ms. A simulation condition is that an operating frequency is 100 kHz, a polarity of FSK is positive, a depth is 1 (used as −78 ns), and 6 bytes (44 ms is required) is used as out-band link information in ASK communication for the out-band link.

Next, a Bluetooth connection establishment duration includes three sub-durations of advertising, CONNECTION_IND message transmission, and link connection setup. A total required time of the Bluetooth connection establishment duration may be acquired by calculating and adding a processing time of each of the three sub-durations. Therefore, hereinafter, a required time of the Bluetooth connection establishment duration is calculated with reference to FIG. 28 to FIG. 32.

Figure 28:
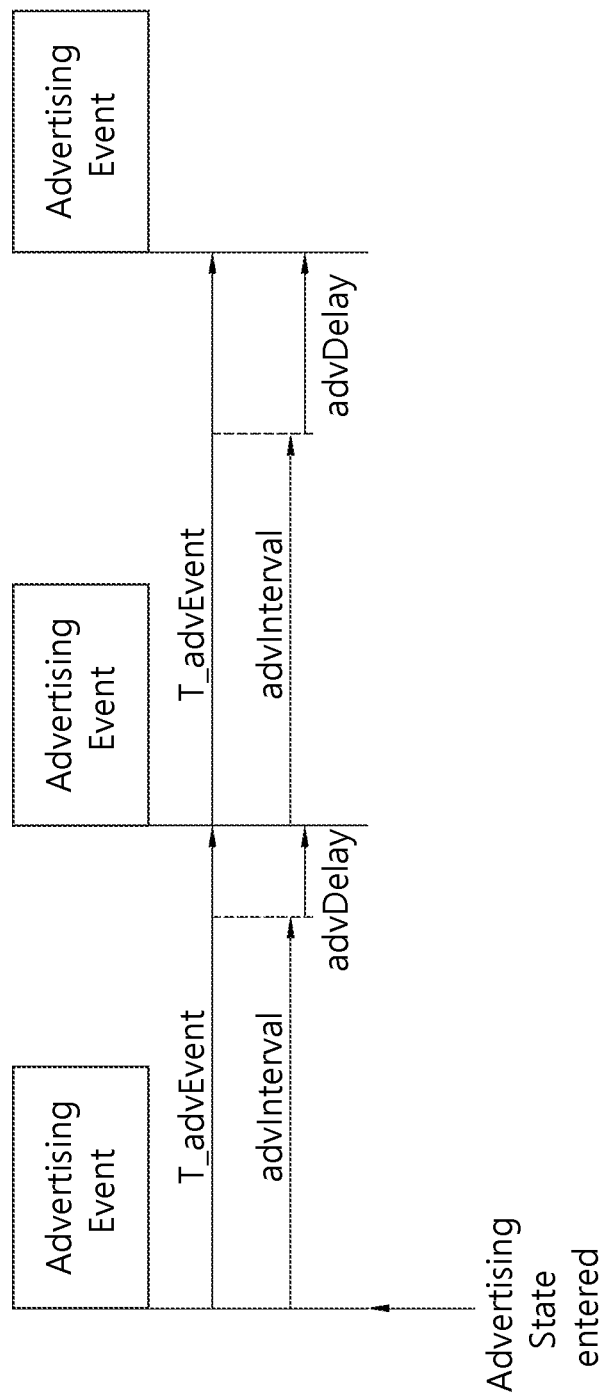
FIG. 28 is a flowchart illustrating an advertising operation timing in Bluetooth communication.

FIG. 28 is a flowchart illustrating an advertising operation timing in Bluetooth communication.

Figure 29:
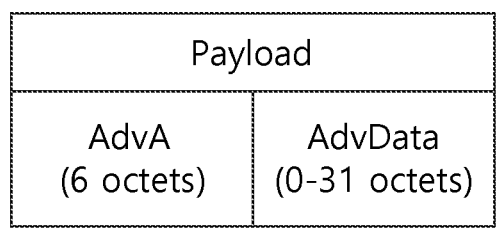
FIG. 29 shows an example of an ADV_IND packet.

Referring to FIG. 28, an advertising duration 'advInterval' may be 20 ms, and an advertising delay 'advDely' may be 0 ms to 10 ms according to a pseudo-random value. The ADV_IND packet as shown in FIG. 29 is advertised by a timing based on FIG. 28. The ADV_IND packet consists of 47 bytes (payload 37 bytes+overhead 10 bytes), which is equivalent to 376 bits. Herein, the payload includes an AdvA field indicating a BLE device address (MAC address) of a wireless power receiver, and an AdvData field including UUID indicating a wireless charging service. The ADV_IND packet of 47 bytes is advertised according to the timing of FIG. 28, and a required time is calculated to be about 0.4 ms.

Figure 30:
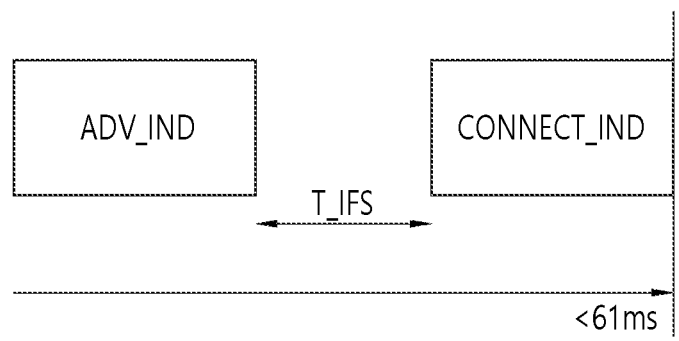
FIG. 30 is a flowchart illustrating a transmitting timing of a CONNECTION_IND message in Bluetooth communication.

FIG. 30 is a flowchart illustrating a transmitting timing of a CONNECTION_IND message in Bluetooth communication.

Referring to FIG. 30, scan window and scan interval parameters for Bluetooth communication of a wireless power transmitter are set to the same value, so that a Bluetooth link layer of the wireless power transmitter can continuously scan primary advertising channels.

Figure 31:
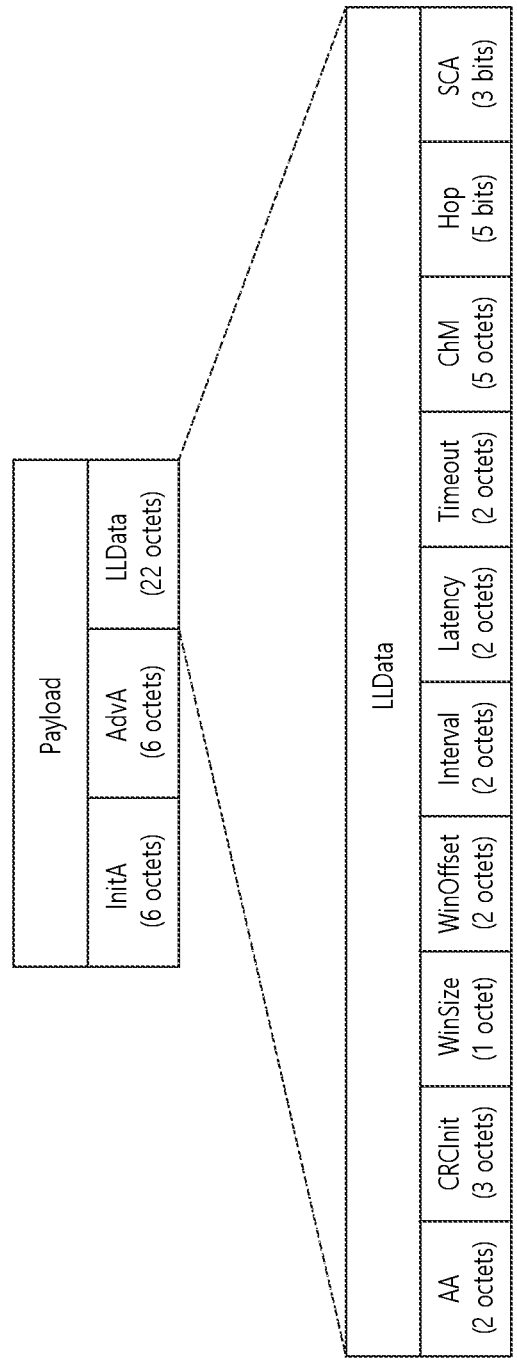
FIG. 31 shows an example of a structure of a CONNECT_IND message.

An inter frame space (IFS) time T_IFS is 150 us, and a CONNECT_IND message is 352 bits, i.e., 44 bytes ((preamble(1B)+access address(4B)+header(2B)+payload (34B)+CRC(3B)) as shown in FIG. 31. Therefore, a time required for transmission of the CONNECT_IND message is about 0.4 ms. For reference, as shown in FIG. 31, the CONNECT_IND message includes an InitA field indicating a Bluetooth device address of the wireless power transmitter, an AdvA field indicating a Bluetooth device address of a wireless power receiver, and an LLData field including a parameter related to a connection.

Figure 32:
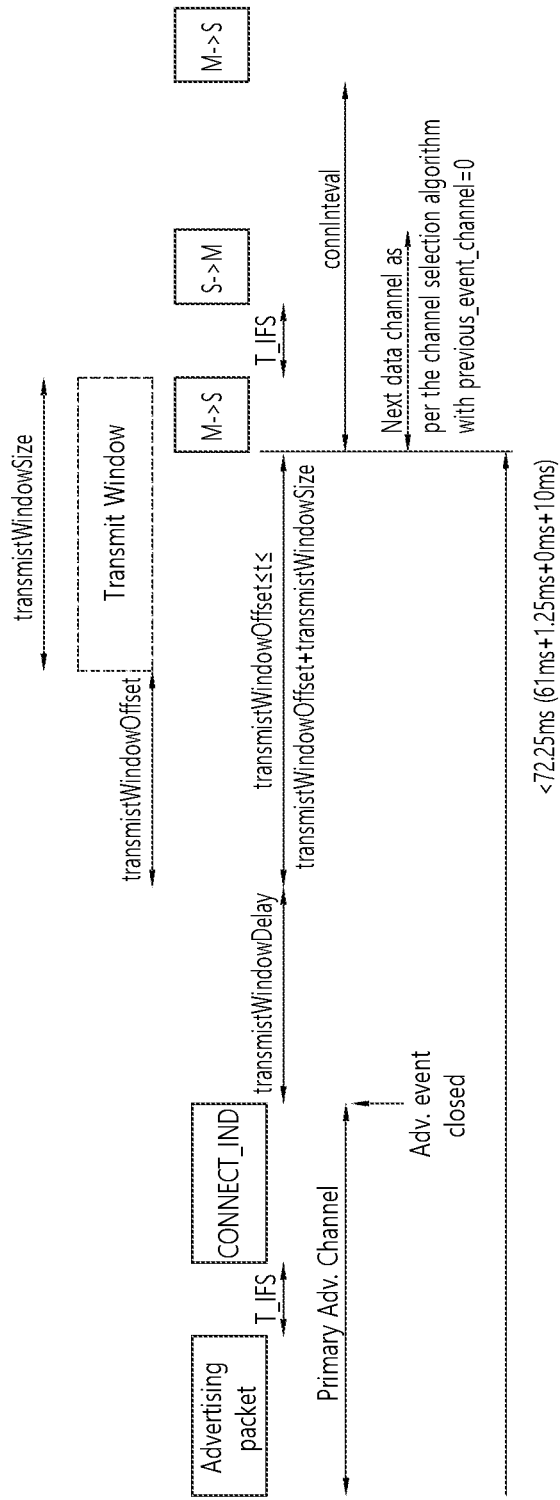
FIG. 32 is a flowchart illustrating a timing of a link connection setup in Bluetooth communication.

FIG. 32 is a flowchart illustrating a timing of a link connection setup in Bluetooth communication.

Referring to FIG. 32, a transmission window delay 'transmitWindowDelay' for a CONNECT_IND message is 1.25 ms, a transmission window offset 'transmitWindowOffset' is a multiple of 1.25 ms in the range from 0 ms to connInterval, a transmission window size 'transmitWindowSize' is a multiple of 1.25 ms in the range from 1.25 ms to a smaller value between 10 ms and (connInterval-1.25 ms), and connecInterval is defined as a multiple of 1.25 ms in the range from 7.5 ms to 4.0 s. Therefore, a time required for a link connection setup is less than 61 ms+1.25 ms+0 ms+10 ms=72.25 ms.

A time required until the handover to Bluetooth is complete (or until a Bluetooth connection establishment is complete) is a sum of: i) a required time T_IB of an in-band communication duration; and ii) a required time T_BLE_Setuptime of a Bluetooth connection establishment duration. Therefore, according to an experiment result of FIG. 27 to FIG. 32, it is confirmed that T_IB+T_BLE_Setuptime=425 ms (=352 ms+73 ms).

In a wireless power transmitting method and device or receiving device and method according to embodiments of this specification, because all components or steps are not essential, the wireless power transmitting device and method or receiving device and method may be performed by including some or all of the above-described components or steps. Further, embodiments of the wireless power transmitting device and method or receiving device and method may be performed in combination. Further, it is not necessary that the above components or steps should be performed in the described order, and a step described later may be performed prior to a step described earlier.

The foregoing description is merely illustrative of the technical idea of this specification, and various changes and modifications may be made by those skilled in the art without departing from the essential characteristics of this specification. Therefore, the foregoing embodiments of this specification can be implemented separately or in combination.

Therefore, the embodiments disclosed in this specification are intended to illustrate rather than to limit the scope of this specification, and the scope of the technical idea of this specification is not limited by these embodiments. The scope of protection of this specification should be construed according to the following claims, and all technical ideas within the scope of equivalents to claims should be construed as falling within the scope of this specification.

What is claimed is:

1. A wireless power receiver configured to support out-band communication, the wireless power receiver comprising:
a power pick-up unit configured to receive wireless power from a wireless power transmitter through magnetic coupling with the wireless power transmitter at an operating frequency; and a communication/control unit configured to perform communication with the wireless power transmitter, wherein the wireless power receiver receives a capability packet comprising (i) information for potential power and (ii) an out-band flag informing whether the wireless power transmitter supports the out-band communication in a negotiation phase.

2. The wireless power receiver of claim 1, wherein the communication/control unit is further configured to transmit information regarding handover to the out-band communication to the wireless power transmitter in the negotiation phase, based on in-band communication.

3. The wireless power receiver of claim 2, wherein the information regarding the handover to the out-band communication comprises an out-band medium access control (MAC) address packet of the wireless power receiver.

4. The wireless power receiver of claim 1, wherein the communication/control unit is further configured to transmit information regarding handover to the out-band communication to the wireless power transmitter in a handover phase, based on in-band communication.

5. The wireless power receiver of claim 4, wherein the information regarding the handover to the out-band communication comprises an out-band medium access control (MAC) address packet of the wireless power receiver.

6. The wireless power receiver of claim 1, wherein handover to the out-band communication is initiated by the communication/control unit receiving a request signal which requests for initiation of the handover to the out-band communication from the wireless power transmitter.

7. The wireless power receiver of claim 6, wherein the request signal is a bit pattern of 8 bits informing the handover to the out-band communication.

8. The wireless power receiver of claim 1, wherein the communication/control unit is further configured to:

perform the out-band communication with the wireless power transmitter in a power transfer phase based on completion of handover to the out-band communication; and transmit unique information or bit pattern information for swap detection of the wireless power receiver to the wireless power transmitter by using in-band communication in the power transfer phase.

9. A wireless power transmitter configured to support out-band communication, the wireless power transmitter comprising:

a power conversion unit configured to transmit wireless power to a wireless power receiver through magnetic coupling with the wireless power receiver at an operating frequency; and a communication/control unit configured to perform communication with the wireless power receiver, wherein the wireless power transmitter transmits a capability packet comprising (i) information for potential power and (ii) an out-band flag informing whether the wireless power transmitter supports out-band communication to the wireless power receiver in a negotiation phase.

10. The wireless power transmitter of claim 9, wherein the communication/control unit is further configured to receive information regarding handover to the out-band communication from the wireless power receiver in the negotiation phase, based on in-band communication.

11. The wireless power transmitter of claim 10, wherein the information regarding the handover to the out-band communication comprises an out-band medium access control (MAC) address packet of the wireless power receiver.

12. The wireless power transmitter of claim 9, wherein the communication/control unit is further configured to receive information regarding handover to the out-band communication from the wireless power receiver in a handover phase, based on in-band communication.

13. The wireless power transmitter of claim 12, wherein the information regarding the handover to the out-band communication comprises an out-band medium access control (MAC) address packet of the wireless power receiver.

14. The wireless power transmitter of claim 9, wherein handover to the out-band communication is initiated by the communication/control unit transmitting a request signal which requests for initiation of the handover to the out-band communication to the wireless power receiver.

15. The wireless power transmitter of claim 14, wherein the request signal is a bit pattern of 8 bits informing the handover to the out-band communication.

16. The wireless power transmitter of claim 9, wherein the communication/control unit is further configured to:

perform the out-band communication with the wireless power receiver in a power transfer phase based on completion of handover to the out-band communication; and receive unique information or bit pattern information for swap detection of the wireless power receiver from the wireless power receiver by using in-band communication in the power transfer phase.

17. A method of performing heterogeneous communication by a wireless power receiver configured to receive wireless power from a wireless power transmitter through magnetic coupling with the wireless power transmitter at an operating frequency, the method comprising:

receiving in a negotiation phase, from the wireless power transmitter through in-band communication using the operating frequency, a capability packet comprising an out-band flag informing whether the wireless power transmitter supports out-band communication using a frequency other than the operating frequency;

receiving, from the wireless power transmitter, a request signal which requests for a handover to out-band;

performing the handover to out-band;

receiving the wireless power in a power transfer phase; and transmitting, to the wireless power transmitter by using the in-band communication in the power transfer phase, identification information for swap detection of the wireless power receiver.

* * * * *